US012485344B2

(12) United States Patent
Eskilander et al.

(10) Patent No.: US 12,485,344 B2
(45) Date of Patent: Dec. 2, 2025

(54) TRIGGERING MECHANISM

(71) Applicant: GAIM Immersive Technology Group AB, Malmö (SE)

(72) Inventors: Stephan Eskilander, Lund (SE); Tobias Hörngren, Lomma (SE); Oscar Borg, Limhamn (SE)

(73) Assignee: GAIM Immersive Technology Group AB, Malmö (SE)

( * ) Notice: Subject to any disclaimer, the term of this patent is extended or adjusted under 35 U.S.C. 154(b) by 273 days.

(21) Appl. No.: 18/502,698

(22) Filed: Nov. 6, 2023

(65) Prior Publication Data

US 2024/0157232 A1 May 16, 2024

(30) Foreign Application Priority Data

Nov. 11, 2022 (SE) .................................... 2251323-8

(51) Int. Cl.
*A63F 13/245* (2014.01)
*A63F 13/837* (2014.01)
*A63F 13/92* (2014.01)

(52) U.S. Cl.
CPC .......... *A63F 13/245* (2014.09); *A63F 13/837* (2014.09); *A63F 13/92* (2014.09)

(58) Field of Classification Search
CPC .......... F41A 19/12; F41A 19/35; F41A 19/38; F41A 19/40; F41A 19/58; F41A 19/69; F41A 33/00; A63F 13/245; A63F 13/837
See application file for complete search history.

(56) References Cited

U.S. PATENT DOCUMENTS 3,309,484 A * 3/1967 Frenzel .................. H01H 9/061 200/324
5,901,488 A * 5/1999 Oberlin ................... F41A 19/62 42/84
6,053,814 A * 4/2000 Pchenitchnikov .... A63F 13/219 463/43
8,480,491 B2 * 7/2013 Burgess .................. A63F 13/92 463/36
10,001,333 B1 6/2018 Heizer et al.
(Continued)

FOREIGN PATENT DOCUMENTS

CA 3218275 A1 * 5/2024 .............. F41A 33/00
CN 102974099 A * 3/2013 ........... A63F 13/285
(Continued)

*Primary Examiner* — Steven J Hylinski
(74) *Attorney, Agent, or Firm* — Capitol City TechLaw

(57) ABSTRACT

A triggering mechanism for a weapon may include a moveably arranged trigger; an actuator slidably arranged along a path; and a releasable coupling. The releasable coupling member may be configured to couple the actuator with the trigger such that when a pulling motion is exerted on the trigger, the actuator moves in a first direction along the. An adjustable stop member may be configured to stop the movement of the actuator in the first direction at an adjustable stop position, such that further pulling motion on the trigger causes the actuator to be released from the trigger and to be moved in a second direction along the path. The second direction is different than the first direction. A sensor may be configured to detect movement of the actuator in the second direction and in response to the detection transmit a trigger signal.

20 Claims, 10 Drawing Sheets

(56) References Cited

U.S. PATENT DOCUMENTS

| | | | | |
|---|---|---|---|---|
| 10,279,250 | B2 * | 5/2019 | Burgess | A63F 13/20 |
| 10,775,125 | B1 * | 9/2020 | Owen, Jr. | F41A 33/00 |
| 2011/0047847 | A1 * | 3/2011 | Hughes | F41A 19/16 42/84 |
| 2015/0211823 | A1 | 7/2015 | Swensen | |
| 2016/0258706 | A1 * | 9/2016 | Ollig | F41A 33/00 |
| 2016/0351362 | A1 * | 12/2016 | Tsai | A63F 13/24 |
| 2018/0259285 | A1 * | 9/2018 | Galie | F41A 19/16 |
| 2019/0041164 | A1 * | 2/2019 | Hughes | F41G 3/2655 |
| 2020/0080812 | A1 * | 3/2020 | Galie | F41A 19/17 |
| 2022/0214127 | A1 | 7/2022 | French et al. | |

FOREIGN PATENT DOCUMENTS

| | | | | | |
|---|---|---|---|---|---|
| CN | 104121806 | A | * | 10/2014 | |
| CN | 107024142 | A | * | 8/2017 | F41A 33/02 |
| CN | 207335531 | U | * | 5/2018 | |
| CN | 207456282 | U | * | 6/2018 | |
| CN | 108472542 | A | * | 8/2018 | A63F 13/24 |
| CN | 104667525 | B | * | 8/2020 | |
| DE | 2926559 | A1 | | 1/1981 | |
| FR | 2189700 | A1 | | 1/1974 | |
| GB | 1439128 | A | * | 6/1976 | F41C 27/06 |
| GB | 2391292 | A | * | 2/2004 | F41A 19/10 |

* cited by examiner

TRIGGERING MECHANISM

This application claims priority under 35 USC 119(a)-(d) from SE 2251323-8 filed on Nov. 11, 2022, the entire contents of which are incorporated herein by reference.

BACKGROUND

1. Technical Field

The present invention relates to a triggering mechanism for a weapon or a game controller, and more particularly to a triggering mechanism for electrical triggering of a weapon.

2. Discussion of Related Art

Weapons, such as handguns, firearms and the like, are used for a wide variety of purposes, including in military or law enforcement operations, hunting and sports.

Due to the inherent danger, and risk of harm, associated with the use of such weapons, it if necessary for all users to undergo extensive training, and undertake frequent practice. However, because such training often involves sharp or live firing of a weapon, it is necessary to do such training in shooting ranges or other purpose-built facilities, to prevent bystanders from being hurt or wounded by direct fire and/or ricochets. The shooting ranges, or shooting facilities, usually require a large amount of safety features and equipment, such as bullet traps, barriers and the like. Hence, they are often expensive to construct, and users are commonly required to travel to said range or facility for each and every practice session.

Furthermore, at each training session, the user will necessarily use vast amount of ammunition. Ammunition is not only expensive for the user but also harmful to the environment. For example, lead, which is commonly used in bullets for most firearms, is particularly bad for the environment. The use of lead bullets may therefore contaminate the area surrounding the shooting range or facility. Environmental protection laws are, in some countries, very strict with regard to lead contamination, forcing shooting ranges to ensure that no lead fragments are left in the nature.

The related art has attempted to overcome the above-mentioned problems by providing systems for simulation of shooting scenarios and/or sharp or live shooting scenarios.

A known method is the use of lasers to simulate firearm operations, where the simulation firearm is equipped with a laser that transmits a laser beam upon triggering of the firearm mechanism.

Other known methods relate to the entertainment industry, where video games or the like have been used to simulate shooting scenarios. These video games often employ a dummy firearm that enables "shooting" by use of various input devices.

The above-mentioned simulation devices often rely on electrical triggering of the simulation weapon, e.g. to start the laser beam, or to indicate to the video game that the weapon has been fired.

However, known triggering devices and triggering methods using an electrical output signal have several drawbacks. For example, it may be difficult to get the "right" feeling in the trigger.

From the above, it is understood that there is room for improvements and the invention aims to solve or at least mitigate the above and other problems.

SUMMARY

The invention is defined by the appended independent claims. Additional features and advantages of the concepts disclosed herein are set forth in the description which follows, and in part will be clear from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

According to a first aspect, there is provided a triggering mechanism for a weapon, the triggering mechanism comprising: a moveably arranged trigger; an actuator slidably arranged along a path; a releasable coupling member, wherein the releasable coupling member is configured to couple the actuator with the trigger such that when a pulling motion is exerted on the trigger, the actuator moves in a first direction along the path; an adjustable stop member configured to stop the movement of the actuator in the first direction at an adjustable stop position, such that further pulling motion on the trigger causes the actuator to be released from the trigger and to be moved in a second direction along the path, wherein the second direction is different to the first direction; and a sensor configured to detect movement of the actuator in the second di-rection and in response to the detection transmit a trigger signal.

The triggering mechanism is advantageous in that it has an adjustable trigger travel distance. The feeling experienced by the user when pulling the trigger, is therefore close to the "true" feeling of a mechanically triggered sharp-loaded weapon. In other words, the trigger mechanism mimics the feeling of a mechanically triggered sharp-loaded weapon. Furthermore, the triggering mechanism can be adjusted to mimic the feeling of a variety of mechanically triggered sharp-loaded weapons. This is of particular importance if the trigger is used for training purposes.

Preferably, the adjustable stop member comprises one or more of: a threaded member extending along the path and a translationally fixed engaging member for engaging with the threaded member, wherein a position of the threaded member along the path is adjustable by a screwing motion; a rack and pinion assembly comprising: a rack gear extending along the path, and a rotatable pinion gear arranged to engage with the rack gear, wherein a position of the rack gear along the path is adjustable by a rotation of the pinion gear; a plurality of pins extending along an axis substantially perpendicular to the path and spaced apart along the path, wherein the pins are moveable along the axis, and wherein each of the plurality of pins is arranged to, in a first position, stop the movement of the actuator in the first direction, and in a second position, allow movement of the actuator in the first direction; a sliding member slidably arranged along the path, wherein the sliding member comprises a stop portion for interaction with the actuator; and a dual pin arrangement comprising: a main pin extending along the path and arranged to be moveable along the path, wherein the main pin comprises a plurality of engaging portions; and an engaging pin arranged to engage with the engaging portions of the main pin so as to prevent movement of the main pin.

More preferably, the adjustable stop member comprises: a threaded member extending along the path, and a translationally fixed engaging member for engaging with the threaded member, wherein a position of the threaded member along the path is adjustable by a screwing motion.

Most preferably, the threaded member is a screw, wherein the fixed engaging member is a nut, and wherein the position of the screw along the path is adjustable by a screwing motion preformed on the screw.

Preferably, the triggering mechanism further comprises a force exerting member arranged to oppose a movement of the actuator in the first direction. The force exerting member may be configured to cause the actuator to move in the second direction when the actuator has been released from the trigger. The force exerting member may comprise one or more of: a stiffness member and a magnetic member.

Preferably, the triggering mechanism further comprises a force adjustment member configured to adjust the force exerted by the force exerting member. The force adjustment member may comprise one or more of: a threaded member extending along the path and arranged to contact the force exerting member, and a translationally fixed engaging member for engaging with the threaded member, wherein a position of the threaded member along the path is adjustable by a screwing motion; a rack and pinion assembly comprising: a rack gear extending along the path and arranged to contact the force exerting member, and a rotatable pinion gear arranged to engage with the rack gear, wherein a position of the rack gear along the path is adjustable by a rotation of the pinion gear; a sliding member slidably arranged along the path, wherein the sliding member comprises a portion for interaction with the force exerting member; and a dual pin arrangement comprising: a main pin extending along the path and arranged to be moveable along the path, wherein an end portion of the main pin is arranged to contact the force exerting member, wherein the main pin comprises a plurality of engaging portions; and an engaging pin arranged to engage with the engaging portions of the main pin so as to prevent movement of the main pin.

The force adjustment member is advantageous in that it allows trigger resistance of the triggering mechanism to be adjustable. The feeling experienced by the user when pulling the trigger, is therefore close to the "true" feeling of a mechanically triggered sharp-loaded weapon. In other words, the trigger mechanism mimics the feeling of a mechanically triggered sharp-loaded weapon. Furthermore, the triggering mechanism can be adjusted to mimic the feeling of a variety of mechanically triggered sharp-loaded weapons. This is of particular importance if the trigger is used for training purposes.

The sensor may comprise one or more of: a proximity sensor; a contact sensor; an optical sensor; and an internal motion sensor.

The releasable coupling member may comprise one or more of: a magnetic coupling member, a flexible lever, and a pivotably arranged lever connected to a stiff-ness member. The magnetic coupling member may comprise one or more of: a magnet with a first magnetic pole attached to the actuator and wherein the trigger comprises a magnetic material forming a second magnetic pole of opposite polarity to the first magnetic pole; a magnet with a first magnetic pole attached to the actuator and a magnet with a second magnetic pole of opposite polarity to the first magnetic pole attached to the trigger; and a magnet with a first magnetic pole attached to the trigger, and where-in the actuator comprises a magnetic material forming a second magnetic pole of opposite polarity to the first magnetic pole.

The trigger may be pivotably or slidably arranged. The trigger may comprise a first portion and a second portion, wherein the first and second portions are separated by the pivot. The releasable coupling member may be configured to couple the first portion of the trigger to the actuator, and the second portion may be configured to receive the pulling motion. The trigger may comprise a curved portion, wherein the curved portion is configured to receive the pulling motion by the user.

The weapon may be a firearm. The weapon may additionally, or alternatively, be a simulation weapon.

According to a second aspect, there is provided a method for triggering a weapon, the method comprising: adjusting a stop position of an adjustable stop member; coupling, by a releasable coupling member, a moveably arranged trigger with an actuator slidably arranged along a path; performing a pulling motion on the trigger so as to move the actuator in a first direction along the path; stopping, by the adjustable stop member, the movement of the actuator in the first direction at the stop position; performing further pulling motion on the trigger so as to cause the actuator to be released from the trigger and to be moved in a second direction along the path, wherein the second direction is different to the first direction; detecting, by a sensor, movement of the actuator in the second direction; and transmitting, in response to the detection, a trigger signal.

According to a third aspect, there is provided a triggering mechanism for a weapon, the triggering mechanism comprising: a moveably arranged trigger; an actuator slidably arranged along a path; a releasable coupling member, wherein the releasable coupling member is configured to couple the actuator with the trigger such that when a pulling motion is exerted on the trigger, the actuator moves in a first direction along the path; a force exerting member arranged to oppose a movement of the actuator in the first direction; a force adjustment member configured to adjust a force exerted by the force exerting member on the actuator; and a stop member configured to stop the movement of the actuator in the first direction at a stop position, such that further pulling motion on the trigger causes the actuator to be released from the trigger and to be moved in a second direction along the path, wherein the second direction is different to the first direction; and a sensor configured to detect movement of the actuator in the second di-rection and in response to the detection transmit a trigger signal.

According to a fourth aspect, there is provided a triggering mechanism for a weapon, the triggering mechanism comprising: a moveably arranged trigger; an actuator slidably arranged along a path; a releasable coupling member, wherein the releasable coupling member is configured to couple the actuator to the trigger such that when a pulling motion is exerted on the trigger, the actuator moves in a first direction along the path; a force exerting member arranged to oppose a movement of the actuator in the first direction, wherein a force exerted by the force exerting member on the actuator is configured to be dependent on the pulling motion, wherein the force exerting member is arranged to, in response to the exerted force exceeding a predetermined amount, cause the actuator to be released from the trigger and to be moved in a second direction along the path, wherein the second direction is different to the first direction; a sensor configured to detect movement of the actuator in the second di-rection and in response to the detection transmit a trigger signal; and a force adjustment member configured to adjust the force exerted by the force exerting member.

Preferably, the adjustable stop member of the third and/or fourth aspect comprises one or more of: a threaded member extending along the path and arranged to contact the force exerting member, and a translationally fixed engaging member for engaging with the threaded member, wherein a position of the threaded member along the path is adjustable by a screwing motion; a rack gear extending along the path and a rotatable pinion gear arranged to engage with the rack gear, wherein a position of the rack gear along the path is adjustable by a rotation of the pinion gear; a sliding member slidably arranged along the path, wherein the sliding member comprises a portion for interaction with the force exerting member; and a dual pin arrangement comprising: a main pin extending along the path and arranged to be moveable along the path, wherein an end portion of the main pin is arranged to contact the force exerting member, wherein the main pin comprises a plurality of engaging portions; and an engaging pin arranged to engage with the engaging portions of the main pin so as to prevent movement of the main pin.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Further, in the figures like reference characters designate like or corresponding elements or parts throughout the several figures. The first digit in the reference character denotes the first figure in which the corresponding element or part appears.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the claimed invention.

Hereinafter, certain embodiments will be described more fully with reference to the accompanying drawings. It will be apparent to those skilled in the art that various modifications and variations can be made without departing from the inventive concept. Other embodiments will be apparent to those skilled in the art from consideration of the specification and practice disclosed herein. It is to be understood that elements and materials may be substituted for those illustrated and described herein, parts and processes may be reversed or omitted, certain features may be utilized independently, and embodiments or features of embodiments may be combined, all as would be apparent to the skilled person in the art.

The embodiments herein are provided by way of example so that this disclosure will be thorough and complete, and will fully convey the scope of the inventive concept, and that the claims be construed as encompassing all modifications, equivalents and alternatives of the present inventive concept which are apparent to those skilled in the art to which the inventive concept pertains. If nothing else is stated, different embodiments may be combined with each other.

Although reference will be made to directions (e.g. left, right, up, down) as shown in the figures, it will be appreciated that these references are purely for illustrative purposes, and that embodiments are not limited to such directions.

Figure 1A:
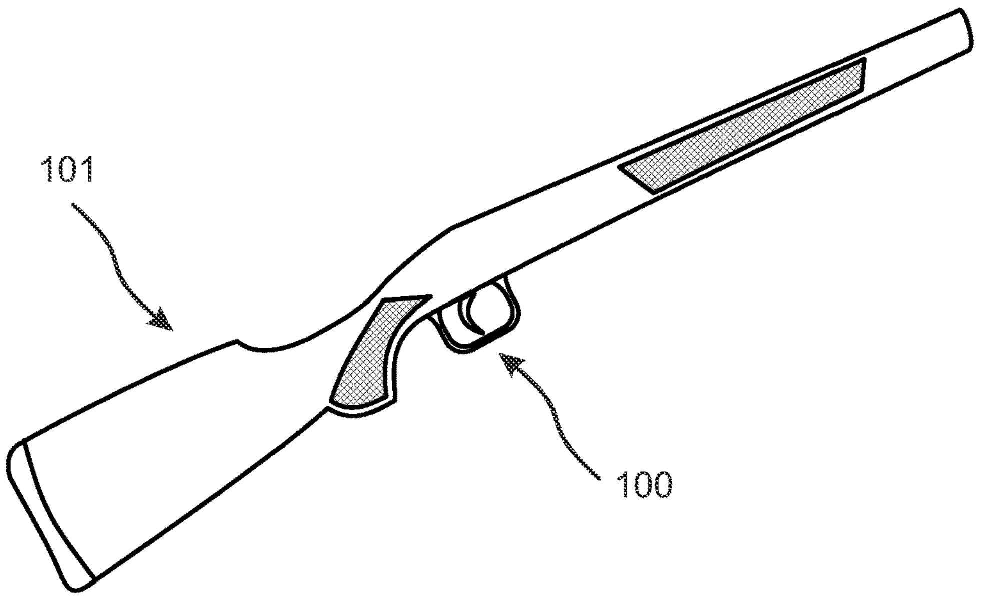
FIG. 1*a* shows a weapon for use with embodiments.

FIG. 1*a* shows a weapon 101 comprising a triggering mechanism 100 according to embodiments.

The triggering mechanism 100 is configured to define and recognize a triggering event. A triggering event occurs when a trigger of the triggering mechanism 100 is pulled sufficiently far back. A triggering event may accordingly be defined to occur when the trigger is pulled back past a trigger threshold position. When a triggering event occurs, (i.e. when the trigger moves past the trigger threshold position), the triggering mechanism 100 is configured to send an electrical trigger signal. The trigger mechanism 100 may accordingly be referred to as a triggering mechanism for electrical triggering (of weapons). The trigger signal may be used to fire a weapon 101 or to indicate to a processor that a triggering event has occurred.

When a user performs a pulling motion on the trigger, the distance travelled by the trigger until the triggering event occurs may be referred to as a trigger travel distance. In known firearms, with mechanical triggering of the firing mechanism, the trigger travel distance may vary from firearm to firearm. A user accustomed to a certain firearm may therefore expect a specific trigger travel distance.

Furthermore, in known firearms with mechanical trigger of the firing mechanism, the force necessary to perform the pulling motion on the trigger, and/or the force necessary to pull the trigger past the trigger threshold position, may vary between different firearms. In other words, different firearms have different resistances to the pulling motion. A user accustomed to a certain firearm may therefore expect a specific resistance when performing the pulling motion on the trigger.

It is accordingly desirable to achieve a triggering mechanism for electrical triggering of a weapon, where the feeling experienced by the user when pulling the trigger, is close to the "true" feeling of a mechanically triggered sharp-loaded weapon.

It is also desirable to achieve a triggering mechanism for electrical triggering of a weapon, where the feeling experienced by the user when pulling the trigger, mimics the feeling of a mechanically triggered sharp-loaded weapon. This is of particular importance if the trigger is used for training purposes.

Furthermore, it is desirable to achieve a triggering mechanism for electrical triggering of a weapon, where the feeling experienced by the user when pulling the trigger can be adjusted to mimic the feeling of a variety of mechanically triggered sharp-loaded weapons.

In particular it is desirable to achieve a triggering mechanism for electrical triggering of a weapon, where the trigger travel distance is adjustable.

In particular, it is also desirable to achieve a triggering mechanism for electrical triggering of a weapon, where the trigger resistance is adjustable.

It is accordingly an objective of embodiments to provide a triggering mechanism achieving some or all of the above-mentioned desires.

The trigger mechanism 100 according to embodiments may be provided as an integral part of the weapon 101. The trigger mechanism 100 may alternatively be provided as a separate part of the weapon 101 that is connectable and/or insertable to the weapon 101. The trigger mechanism 100 may yet as another alternatively be provided remotely from the weapon 101.

The weapon 101 may be a projectile weapon. For example, the weapon 101 may be a firearm (such as a rifle, a handgun, or the like), a bow, a grenade launcher, or the like. The weapon 101 has a firing mechanism that can be triggered electrically by the triggering mechanism 100 according to embodiments.

The weapon 101 may be a weapon for live ammunition, such as bullets, arrows, grenades, or the like.

The weapon 101 may alternatively be a weapon for simulation purposes. A weapon for simulation purposes may be referred to as a simulation weapon. A simulation weapon may include a simulation firing mechanism, such as firing of a laser beam. Alternatively, or additionally, the simulation weapon may be connected to a simulation environment.

Figure 1B:
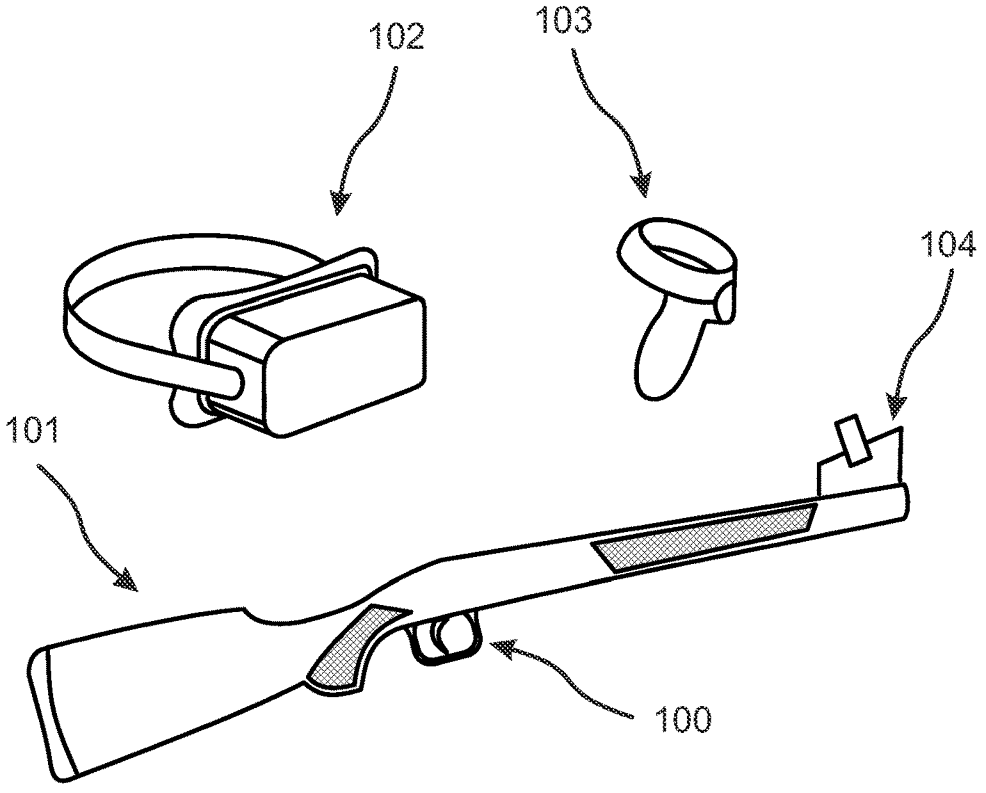
FIG. 1*b* shows a simulation environment for use with embodiments.

FIG. 1*b* shows a simulation environment that can be used with a triggering mechanism 100 according to embodiments. The simulation environment comprises a virtual reality headset 102 and a virtual reality controller 103. The weapon 101 comprises a trigger mechanism 100 according to embodiments. The weapon 101 is preferably provided with a holder 104 for the virtual reality controller 103.

The virtual reality headset 102 may be configured to detect a position and movement of the virtual reality controller 103. Hence, when the controller 103 is inserted in the holder 104 on the weapon 101, the virtual reality headset 102 can detect a position and movement of the weapon 101. The virtual reality headset 102 can thus be configured to detect an aiming direction and/or a firing direction of the weapon. A user can thus, by aiming the weapon 101 (in the real world), aim a corresponding virtual reality weapon in a virtual reality shooting scenario.

The triggering mechanism 100 is preferably configured to communicate with the simulation environment (e.g. the virtual reality headset 102 and/or the virtual reality controller 103). The triggering mechanism 100 can accordingly communicate to the simulation environment as and when a triggering event has occurred. Hence, when the user pulls the trigger of the triggering mechanism 100, the virtual reality weapon may be configured to be fired in the virtual reality shooting scenario. A user can thus perform shooting practice in the simulation environment.

Although the simulation environment is described in relation to a virtual reality simulation environment, it will be appreciated that this is purely for illustrative purposes and embodiments are not limited to said simulation environments. The triggering mechanism 100 according to embodiments may be connected to, or communicate with, any simulation environment including simulation environments in connection with a video game, game console, smart phone, computer, tablet or the like.

FIGS. 2*a* to 2*d* show schematic views of a triggering mechanism 100 according to embodiments.

Figure 2A:
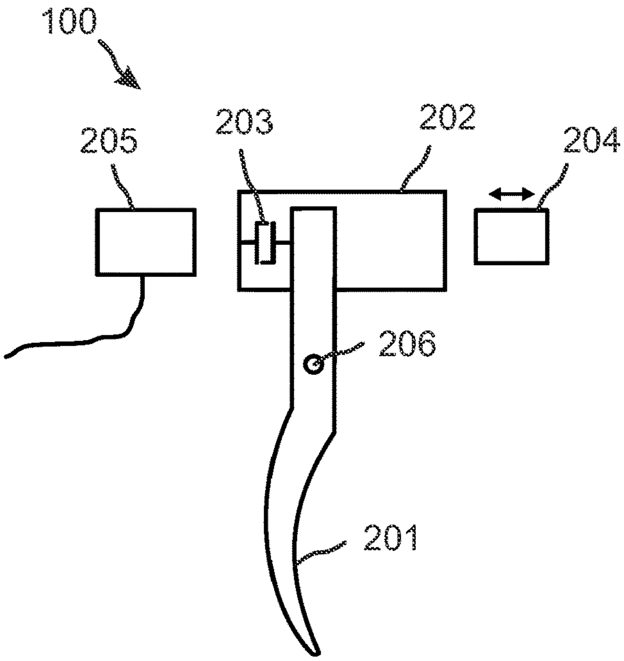
FIGS. 2*a*-2*d* show schematic views of a triggering mechanism according to embodiments.

In FIG. 2*a*, the triggering mechanism 100 is shown in a default state. The triggering mechanism 100 comprises a trigger 201, an actuator 202, a releasable coupling member 203, an adjustable stop member 204 and a sensor 205.

The trigger 201 is pivotably arranged such that it can rotate around a pivot 206. The trigger 201 may also comprise a curved portion which is accessible to a user. When a user pulls the curved portion substantially backwards, in what may be referred to as a pulling motion, the trigger 201 is rotated around its pivot 206.

The actuator 202 is slidably arranged along a path such that it can move in two directions along the path.

In the default position shown in FIG. 2*a*, the actuator 202 is releasably coupled with the trigger 201. The actuator 202 is thus coupled to move with the trigger 201 when a pulling motion is exerted on the trigger 201. The releasable coupling of the trigger 201 with the actuator 202 is achieved by the releasable coupling member 203. The releasable coupling member 203 may be any releasable coupling member capable of coupling the actuator 202 with the trigger 201, and, upon a predetermined condition being met, releasing and/or decoupling the actuator 202 from the trigger 201.

The releasable coupling member 203 may be provided in or on the actuator 202. The releasable coupling member 203 may alternatively be provided in, or on, the trigger 201. Yet as another alternative, a first part of the releasable coupling member 203 may be provided in or on the trigger 201 and a second part of the releasable coupling member 203 may be provided in or on the actuator 202.

Figure 2B:
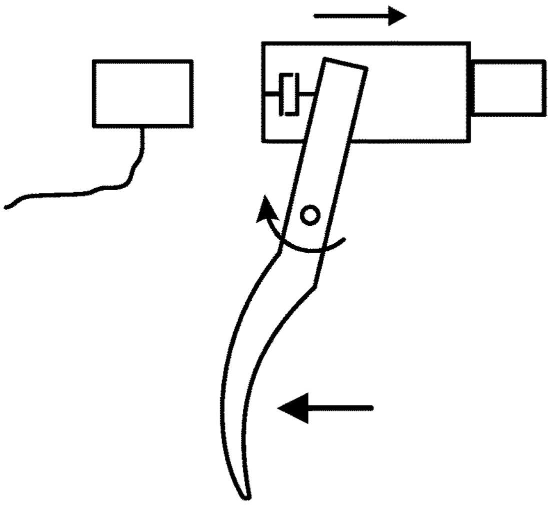

In FIG. 2*b*, a pulling motion is exerted on the trigger 201. The pulling motion is, in this illustrative example, exerted on a lower curved portion of the trigger 201 as indicated by the arrow. The trigger 201 thus rotates around the pivot 206, such that an upper portion of the trigger 201 moves to the right. This causes the coupled actuator 202 to also move to the right.

At the instant shown in FIG. 2*b*, the actuator 202 has moved to abut to the adjustable stop member 204. At this position, the trigger 201 is at the trigger threshold position.

The adjustable stop member 204 may be any member capable of stopping the actuator 202. The adjustable stop member 204 may be arranged, at least partially, in the path of the actuator 202. The adjustable stop member 204 can thus, temporarily, stop the movement of the actuator 202 (as it moves with the trigger 201).

The adjustable stop member 204 may be adjustable such that the position along the path of the actuator 202 where the stop member 204 stops the actuator 202 can be changed or adjusted. Thus, the adjustable stop member 204 can define, and adjust, the trigger threshold position, and in turn also the trigger travel distance.

The triggering mechanism 100 according to embodiments have a trigger travel distance that is adjustable to resemble the trigger travel distances of at least a portion of known (live) weapons or firearms with mechanical triggering of the firing mechanism.

For example, hunting rifles or other hunting firearms, typically have a small trigger travel distance of about 0 to 5 mm, and commonly between about 0 to 3 mm. Handguns used for sporting or law enforcement purposes, on the other hand, typically have a large trigger travel distance of about 9 to 15 mm.

Embodiments include triggering mechanism 100 with an adjustable trigger travel distance of about 0 to 15 mm. The triggering mechanism 100 can therefore be used to resemble most known (live) weapons or firearms with mechanical triggering of the firing mechanism.

Embodiments include triggering mechanism with an adjustable trigger travel distance of about 0 to 5 mm, and optionally about 0 to 3 mm. The triggering mechanism 100 can therefore be used to resemble most all known (live) hunting rifles or other hunting firearms with mechanical triggering of the firing mechanism.

Embodiments include triggering mechanism with an adjustable trigger travel distance of about 9 to 15 mm. The triggering mechanism 100 can therefore be used to resemble most known (live) handguns used for sporting and law enforcement purposes with mechanical triggering of the firing mechanism.

Figure 2C:
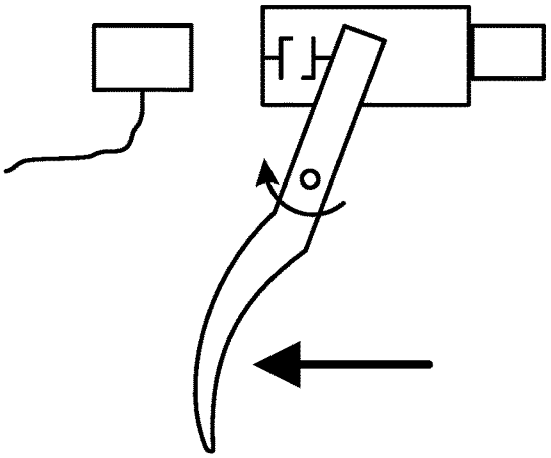

In FIG. 2*c*, further pulling motion is exerted on the trigger 201 after the actuator 202 has been stopped by the stop member 204 (i.e. when the trigger 201 is at the trigger threshold position). As a result of the actuator 202 being stopped by the stop member 204, the actuator 202 cannot follow the trigger 201. The stop member 204 thus causes the releasable coupling member 203 to release the actuator 202 from the trigger 201. In other words, the actuator 202 will be decoupled from the trigger 201. The actuator 202 will thus subsequently move independently of the trigger 201. As a result, the further pulling motion moves the trigger 201 past the trigger threshold position, and a triggering event has occurred.

Figure 2D:
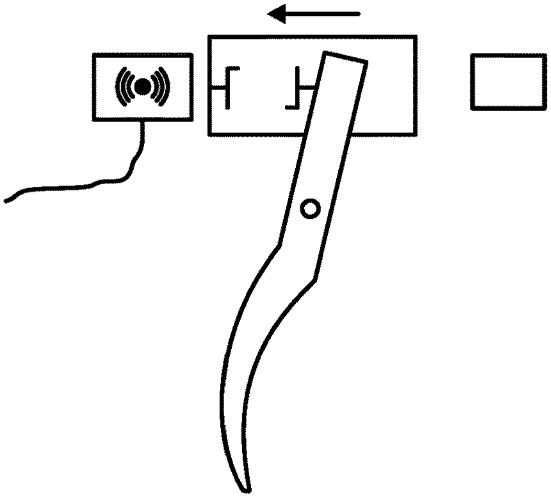

In FIG. 2*d*, the actuator 202 moves in the opposite direction (i.e. to the left) as a result of the decoupling from the trigger 201.

At the point in time shown in FIG. 2*d*, the sensor 205 detects that the triggering event has occurred. The sensor 205 is preferably configured to make such detection from a movement of the actuator 202 after the actuator 202 has been released from the trigger 201. In other words, the sensor 205 is preferably configured to detect a movement of the actuator 202 after release of the actuator 202. The movement detected by the sensor 205 may be a movement of the actuator 202 away from the stop member 204, or in a direction opposite to the previous movement of the actuator 202 (i.e. to the left in the figure).

The sensor 205 may be located along the path of the actuator 202. The sensor 205 may alternatively be located away from the path of the actuator 202. As yet another alternative, the sensor 205 may be located in or on the actuator 202. The sensor 205 may be any sensor capable of detecting such movement. For example, the sensor 205 may comprise one or more of a contact sensor, a proximity sensor, an optical sensor, an internal motion sensor, or any other type of sensor that is known in the art for detecting the movement of the actuator 202.

Examples of a contact sensor may include a micro switch, other types of push buttons, or any other type of sensor capable of detecting a contact between the actuator 202 and the sensor 205. In preferred embodiments, the sensor 205 is a micro switch.

Examples of a proximity sensor may include sensors based on wave reflection. Such sensors may be configured to reflect a wave (e.g. an electromagnetic wave) off a surface of the actuator 202. This includes sensors based on LIDAR, RADAR and/or ultrasound. Examples of a proximity sensor may alternatively, or additionally, include a coil for detection of a magnetic field associated with the actuator 202 (e.g. if the actuator 202 is provided with a magnet), or any other type of sensor capable of detecting that the actuator 202 is located and/or moving in proximity to the sensor 205.

Examples of an optical sensor may include a camera, a photoelectric sensor, or other types of optical sensors capable of detecting a change in light associated with the movement of the actuator 202. For example, a photoelectric sensor (e.g. a phototransistor, photoresistor and/or photodiode) can detect a reduction and/or increase in light in dependence on the actuator 202 being in a certain position. In embodiments, a light emitting diode may be placed on an opposite side of the actuator 202 to the photoelectric sensor, such that the actuator 202, in certain positions, may block an amount of light emitted by the light emitting diode from reaching the photoelectric sensor.

Examples of internal motion sensors include an accelerometer, a gyroscope or the like. The internal motion sensors are preferably placed on the actuator 202 and configured to measure a movement of the actuator 202.

Upon detection of a triggering event, the sensor 205 is configured to transmit a trigger signal. The trigger signal may be transmitted to a processing unit 309. The trigger signal may alternatively, or additionally, be transmitted to an electrically triggered firing mechanism (e.g. of a weapon).

After the triggering event has occurred, the user may release (e.g. remove the finger from) the trigger 201. The trigger 201 may be configured to return to the default position following the release of the trigger 201. For example, a torsional spring may be provided at the pivot 206 such that the trigger 201 is biased towards the default position. The releasable coupling member 203 may be configured to again couple the actuator 202 with the trigger 201 when the trigger 201 returns to the default position.

Figure 3A:
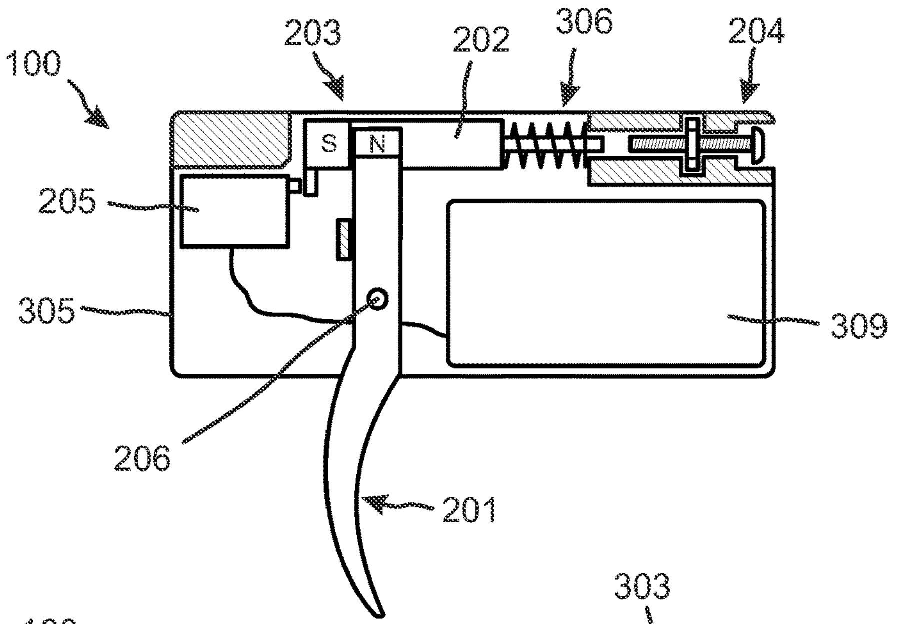
FIGS. 3*a*-3*c* show schematic views of a triggering mechanism according to embodiments.
Figure 3B:
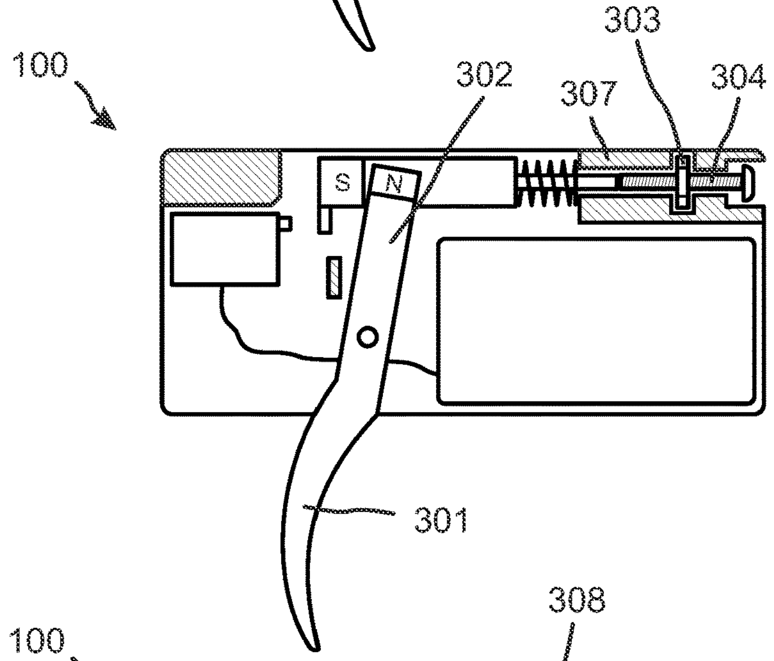
Figure 3C:
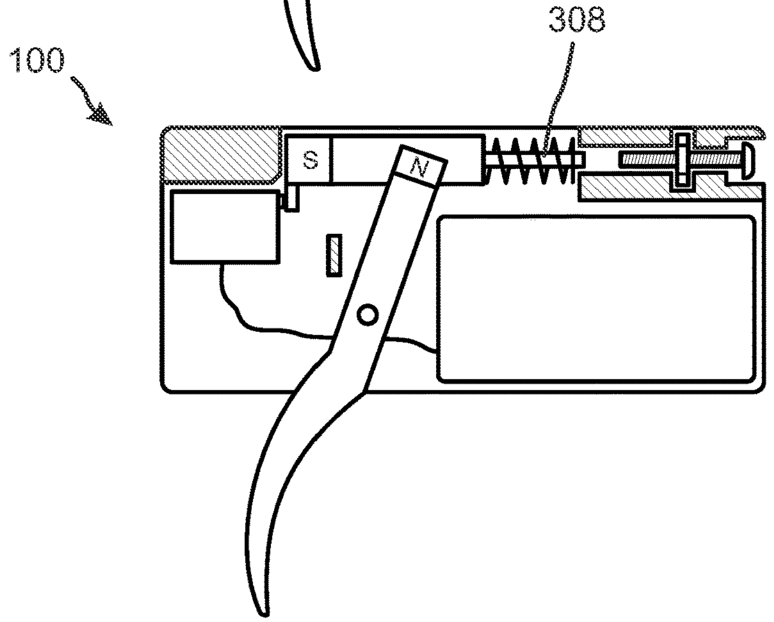

FIGS. 3*a* to 3*c* show a preferred embodiment of a triggering mechanism 100. FIG. 3*a* shows the triggering mechanism 100 in a default position. FIG. 3*b* shows the triggering mechanism 100 at the moment when the actuator 202 is stopped by the stop member 204. FIG. 3*c* shows the triggering mechanism 100 when the actuator 202 has been decoupled from the trigger 201 and moved so as to make contact with the sensor 205.

In the embodiment shown in FIGS. 3*a* to 3*c*, the trigger 201 comprises a first trigger portion 301 and a second trigger portion 302 separated by the pivot 206. The first trigger portion 301 comprises the curved portion onto which the user exercises the pulling motion. The second trigger portion 302 is coupled with, and interacts with, the actuator 202. Thus, when the curved portion of the trigger 201 is pulled back, the second trigger portion 302, coupled to the actuator 202, moves forward.

In the embodiment shown in FIGS. 3*a* to 3*c*, the releasable coupling member 203 is a magnetic coupling member. The magnetic coupling member couples the trigger 201 to the actuator 202 through magnetic attraction forces exerted between magnetic poles on the actuator 202 and on the trigger 201 (or vice versa). In other words, the actuator 202 is magnetically attracted to the trigger 201. Although, FIGS. 3*a* to 3*c* show the actuator 202 having a south magnetic pole, and the trigger 201 having a north magnetic pole, it will be appreciated that embodiments include any configuration capable of achieving a magnetic coupling between the trigger 201 and the actuator 202.

For example, the magnetic coupling member may include one of the following configurations: (i) a magnet attached to the actuator 202 and the trigger 201 comprising a magnetic material attracted to the magnet, (ii) a magnet attached to the actuator 202 and a magnet of opposite polarity attached to the trigger 201, and/or (iii) a magnet attached to the trigger 201, and the actuator 202 comprising a magnetic material attracted to the magnet.

The magnetic attraction force exerted by the magnetic coupling member between the trigger 201 and the actuator 202 is configured to be sufficiently large so as to allow the actuator 202 to be moved with the trigger 201. In other words, the attraction force is larger than any inertia forces experienced by the actuator 202 together with any other opposing forces experienced by the actuator 202. The strength of the magnet(s) may be chosen and tuned accordingly, and this choice will be well within the capabilities of the skilled person.

The feeling the user experiences when pulling the trigger 201 is dependent on the strength of the magnetic attraction force. If the magnetic attraction force is weak, the resistance force experienced by the user at the trigger threshold position may be weak such that the user may not recognize or feel the trigger threshold position (e.g. the user may accidentally trigger the triggering mechanism 100 without knowing or realizing), while if the magnetic attraction force is too strong, the user may struggle to pull the trigger 201 past the trigger threshold position. Preferably, the magnetic attraction force is tuned to mimic the feeling of a sharp-loaded gun with mechanical triggering.

Although, FIGS. 3*a* to 3*c* show a magnetic coupling member, it will be appreciated that this embodiment is combinable with other types of releasable coupling members. Several alternative types of releasable coupling members will be described in relation to FIG. 6.

In the shown embodiment, the adjustable stop member 204 is a screw assembly comprising a screw 304 and a nut 303, or any other threaded member suitable for adjusting a stop position of the actuator 202. The screw 304 is arranged such that its major longitudinal axis is substantially parallel to the path of the actuator 202. A threaded portion of the screw 304 is protruding through the nut 303 which is held firmly in place by a housing 305 of the triggering mechanism 100. Thus, by performing a screwing motion on the head of the screw 304, the length of the threaded portion of the screw 304 that protrudes through the nut 303 may be adjusted. In other words, the relative position of the screw 304 compared to the (fixed) nut 303 may be adjusted. A tip end of the screw 304 (i.e. the left-most portion in FIGS. 3*a* to 3*c*) configured to stop the actuator may thus be moved in a direction parallel to the path of the actuator 202 (i.e. in the left-right direction in FIGS. 3*a* to 3*c*), allowing the position where the actuator 202 is stopped (also referred to as the stop position) to be adjusted.

Preferably, an opening is provided in the housing 305 to allow a user to access the head of the screw 304 without removing the housing 305, as shown in the upper right corner of the housing 305 in FIGS. 3*a* to 3*c*.

Thus, the user can access the screw 304 from outside of the housing 305, and by performing a screwing motion on the screw 304, adjust the trigger threshold position.

Although a screw assembly comprising a screw 304 and a nut 303 is shown in FIGS. 3*a* to 3*c*, embodiments include other screw assemblies relying on a threaded elongated member engaging with a translationally fixed member. It will thus be appreciated that embodiments are not limited to a screw and/or a nut, and that other mutually engaging members are included in embodiments.

For example, the screw assembly may comprise a worm screw assembly. The worm screw assembly may comprise a threaded elongated worm, engaging with a translationally fixed worm wheel. The worm wheel has substantially the shape of a hollow cylinder. The worm wheel comprises, on an external portion, cogs, teeth or the like to engage with the threads of the worm. The worm may be arranged tangentially to the worm wheel.

The worm wheel is threaded on an internal surface. The worm screw assembly further comprises a stop screw in the form of a threaded elongated member. The stop screw is arranged to extend through the worm wheel and to engage with the internal threads of the worm wheel. The stop screw is rotationally fixed but translationally moving along its major longitudinal axis by rotation of the worm wheel.

Thus, by performing a screwing motion on the worm, the worm wheel is caused to rotate. Due to the rotation of the worm wheel, the stop screw, which is rotationally fixed, moves translationally along its major longitudinal axis (due to the engaging threads between the stop screw and the internal surface of the worm wheel). A length of the stop screw that protrudes through the worm wheel is thus adjusted.

The stop screw may be arranged such that its major longitudinal axis is substantially parallel to the path of the actuator 202. The stop screw may at least partially intersect with the path of the actuator 202 such that the actuator 202 is stopped by an end portion of the stop screw. The stop position can accordingly be adjusted by performing a screwing motion on the worm.

A worm screw may be particularly preferred if access is only available from surfaces of the housing 305 perpendicular to the path of the actuator 202 (e.g. the upper side, front side, or back side).

Although, FIGS. 3*a* to 3*c* show a stop member 204 comprising a screw assembly, it will be appreciated that this embodiment is combinable with other types of stop members 204. Several alternative types of stop members 204 will be described in relation to FIG. 5.

In the shown embodiment, the sensor 205 is a contact sensor, such as a microswitch. The sensor 205 is thus configured to detect when the actuator 202 makes contact with the microswitch so as to close the switch.

In the shown embodiment, the triggering mechanism 100 further comprises a force exerting member 306. The force exerting member 306 is configured to exert a force on the actuator 202 so as to oppose a movement of the actuator 202 towards the stop member 204.

The force exerting member 306 may further be configured to move the actuator 202 away from the stop member 204 following the release of the actuator 202 from the trigger 201.

The force exerted by the force exerting member 306 is necessarily less than the coupling force exerted by the releasable coupling member 203. This ensures that the actuator 202 is not released until the stop position has been reached. The force exerted by the force exerting member 306 may be constant. Alternatively, the force exerted by the force exerting member 306 may be varying. For example, the force exerted by the force exerting member 306 may vary in dependence on the position of the actuator 202.

The force exerting member 306 may be a stiffness member, such as a spring (as shown in FIGS. 3*a* to 3*c*), a block of compressible material, or the like. The stiffness member may be configured to exert a force in response to compression or extension of the force exerting member 306.

The force exerting member 306 is preferably located between the actuator 202 and the stop member 204, such that when the actuator 202 moves towards the stop member 204, the force exerting member 306 is compressed. The force exerting member 306 will thus oppose the movement of the actuator 202 towards the stop member.

Although, FIGS. 3*a* to 3*c* show the force exerting member 306 as a stiffness member, it will be appreciated that the embodiment is combinable with other types of force exerting members 306. Several alternative types of force exerting members 306 will be described in relation to FIG. 7.

The trigger mechanism may further comprise one or more holding elements 307. The holding elements 307 may be fixed and are preferably attached to the housing 305. The holding elements 307 may be provided on an opposing end of the force exerting member 306 to the actuator 202. The force exerting member 306 can thus push against the holding elements 307. The position of the holding elements 307 can determine a length of the force exerting member 306. The position of the holding elements 307 may thus also determine a force exerted by the force exerting member 306.

In order to prevent the holding elements 307 from unintentionally stopping the actuator 202, the actuator 202 may be provided with an extension portion 308. The extension portion 308 may be arranged such that it moves towards, and to, the stop member 204 without interacting with the holding elements 307. Thus, it can be ensured that the actuator 202 is only stopped by the stop member 204 when the trigger 201 is pulled. In the embodiments shown in FIGS. 3*a* to 3*c*, the extension portion 308 is a shaft extending through the surrounding force exerting member 306 and the surrounding holding elements 307.

The triggering mechanism 100 may comprise one or more backstop elements. The one or more backstop elements may be fixed in position, and preferably attached to the housing 305. One or more backstop elements may be provided to only allow movement of the trigger 201 in one direction from the default position. This ensures that the sensor 205 is not accidentally triggered, e.g. by pushing the curved portion of the trigger 201 forwards. One or more backstop elements may additionally, or alternatively, be provided to ensure that the actuator 202 cannot move too close to the sensor 205 so as to damage the sensor 205.

The sensor 205 may be connected to a processing unit 309. The processing unit 309 may be located inside the housing 305 of the triggering mechanism 100. Alternatively, the processing unit 309 may be located remotely from the triggering mechanism 100. The processing unit 309 may also be provided as part of the sensor 205.

The sensor 205 may be connected to the processing unit 309 via wired connection means 310, including an electrical conductor such as an electrical cable or wire, an optical fiber cable or any other suitable media for transferring a measured signal, or via wireless connection means such as the Internet, Bluetooth, Wi-Fi or other wireless network.

The processing unit 309 may comprise a communication unit. The communication unit may allow the processing unit 309 to communicate with a simulation environment. The simulation environment may be provided in or on a simulation device such as a virtual reality headset, a game console, a computer, a smart phone, a tablet, or other similar device for running a simulation environment.

The communication unit may communicate with the simulation environment via the Internet, a cloud network, a Wireless Fidelity (Wi-Fi) network, a Wireless Local Area Network (WLAN), a Local Area Network (LAN), a telephone line (POTS), and/or a Metropolitan Area Network (MAN), near-field communication (NFC), a Bluetooth network or other network capable of transferring information between the communication unit and the simulation environment. The communication between the communication unit and simulation environment may be performed in accordance with various communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols. The wireless connection means of the communication unit may be connected directly to the simulation environment, or a device of the simulation environment (such as a virtual reality headset 102 in a virtual reality simulation environment). The wireless connection means of the communication unit may alternatively, or additionally, be connected to the simulation environment via one or more servers, clouds, or similar.

The communication unit may be configured to communicate with the simulation environment in response to the trigger signal being transmitted from the sensor 205 to the processing unit 309. This may, for example, cause a corresponding weapon in the simulation environment to be fired.

In alternative embodiments, the sensor 205 and/or the processing unit 309 may be configured to transmit the trigger signal to a firing unit of a real weapon, such that the firing unit can fire the weapon in response to the trigger signal.

Figure 4A:
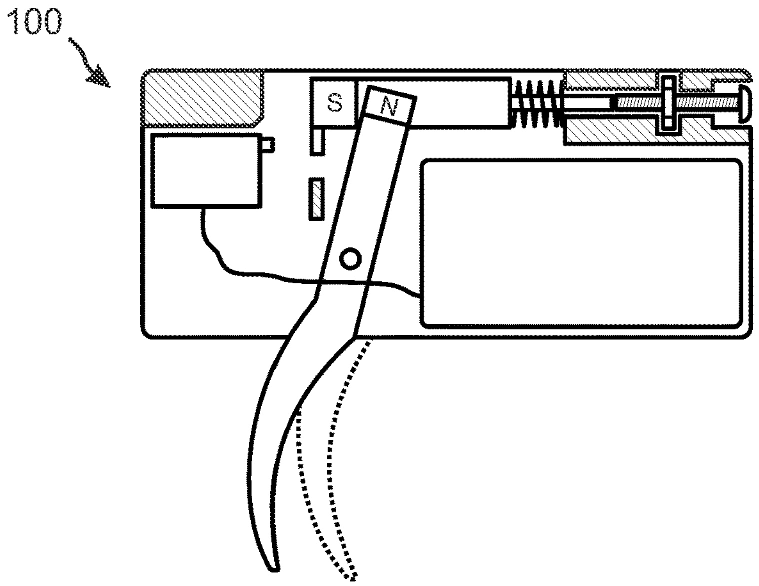
FIGS. 4*a*-4*c* show schematic views of an adjustable trigger travel distance of a triggering mechanism according to embodiments.
Figure 4B:
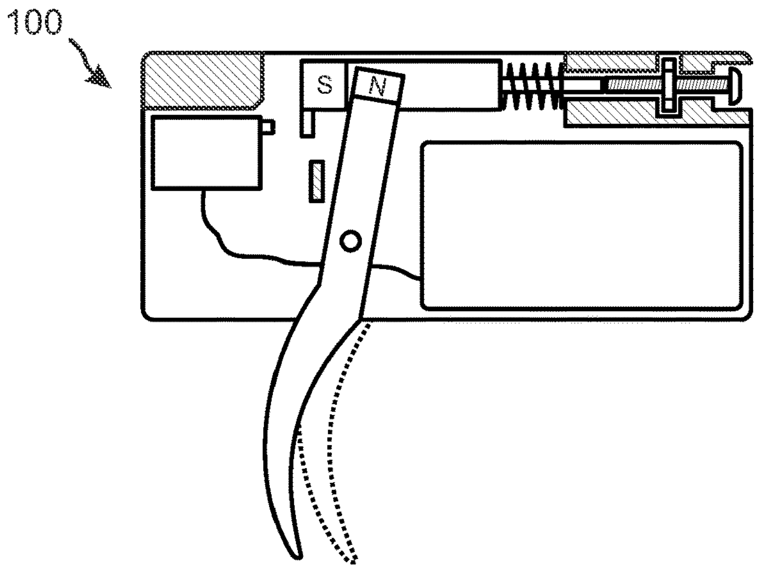
Figure 4C:
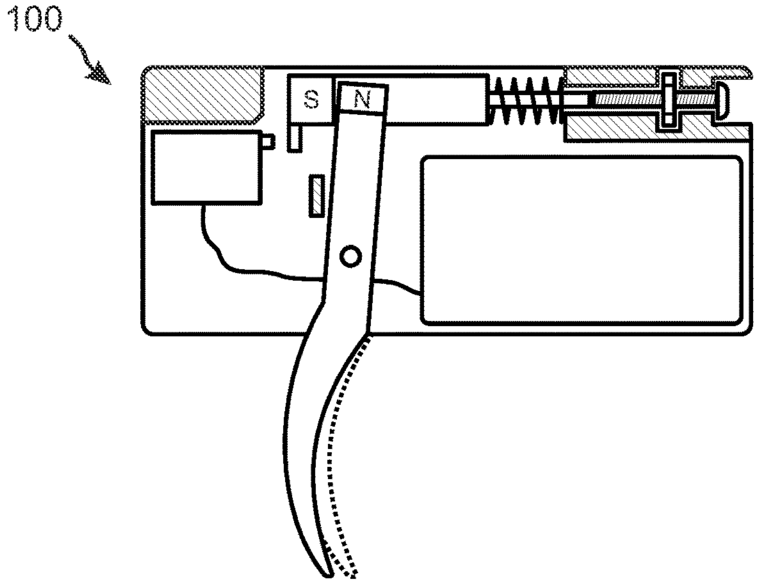

FIGS. 4*a* to 4*c* show how the trigger travel distance can be adjusted by the triggering mechanism 100. Each of the figures show the triggering mechanism 100 at the moment when the actuator 202 has been stopped by the stop member 204. The dashed trigger indicates the position of the trigger 201 in the default position.

In FIG. 4*a*, the adjustable stop member 204 is set to a first end state corresponding to a long trigger travel distance. The stop member 204 is thus located at a position a relatively large distance away (to the right) from the default actuator position. Accordingly, the trigger 201 can be pulled a long distance before the actuator 202 is stopped and decoupled from the trigger 201.

In FIG. 4*b*, the adjustable stop member 204 is set to an intermediate state corresponding to an intermediate trigger travel distance. The stop member 204 is thus located at a position a medium distance away (to the right) from the default actuator position. Accordingly, the trigger 201 can be pulled a medium distance before the actuator 202 is stopped and decoupled from the trigger 201.

In FIG. 4*c*, the adjustable stop member 204 is set to a second end state corresponding to a short trigger travel distance. The stop member 204 is thus located at a position a relatively short distance away (to the right) from the default actuator position. Accordingly, the trigger 201 can be pulled a short distance before the actuator 202 is stopped and decoupled from the trigger 201.

As can clearly be seen in FIGS. 4*a* to 4*c*, the trigger travel distance can be adjusted by the adjustable stop member 204. Although three distinct states have been shown in FIGS. 4*a* to 4*c*, it will be appreciated that the stop position can be continually and/or incrementally adjusted by the adjustable stop member 204.

Figure 5A:
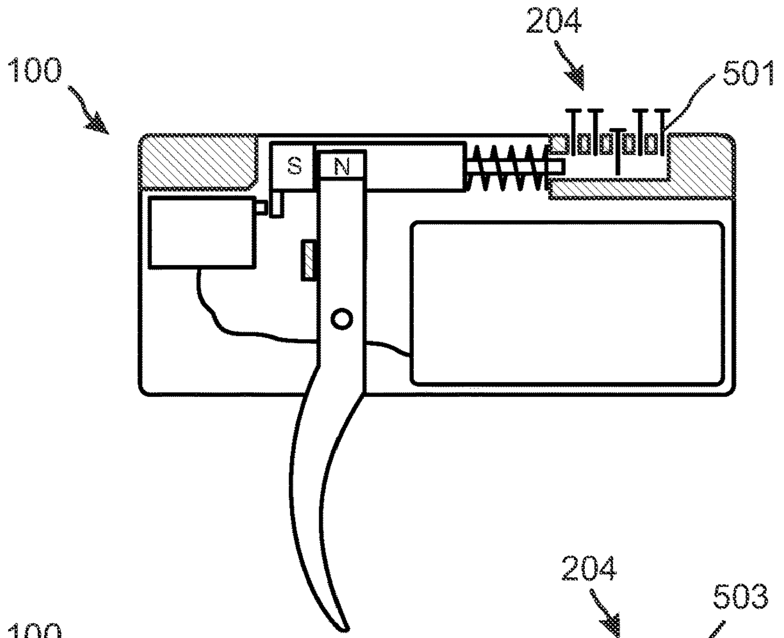
FIGS. 5*a*-5*c* show schematic views of alternative adjustable stop members according to embodiments.
Figure 5B:
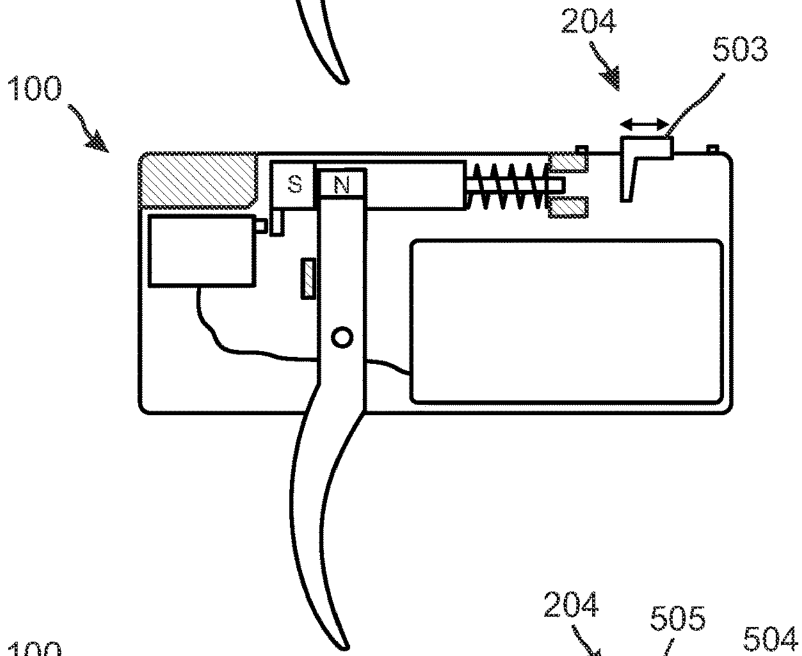
Figure 5C:
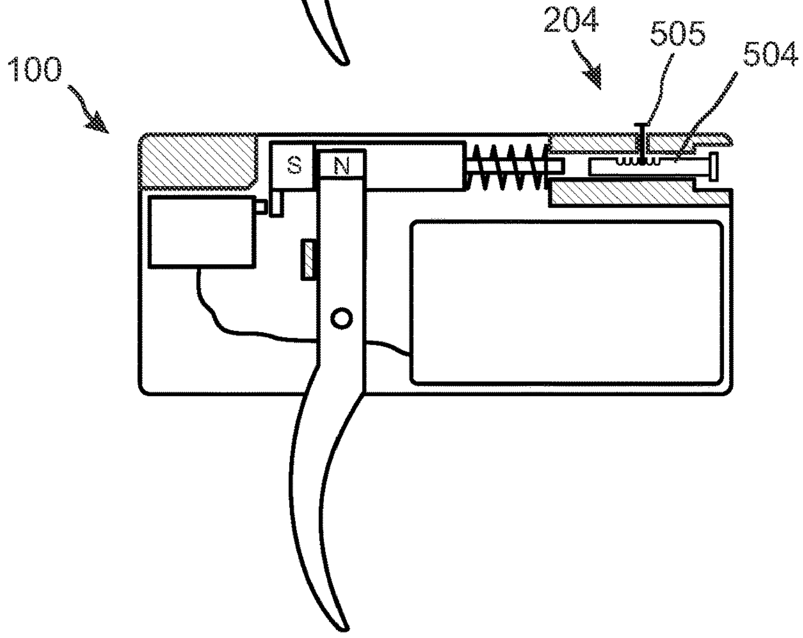

FIGS. 5*a* to 5*c* show alternative types of adjustable stop members 204. It will be appreciated that each of the stop members 204 in FIGS. 5*a* to 5*c* can be combined with previous and/or later described embodiments of the trigger mechanism 100.

FIG. 5*a* shows an adjustable stop member 204 comprising a plurality of pins 501 which a user can selectively push down. When one of the pins 501 is pushed down, the pin crosses the path of the actuator 202 and will accordingly stop the actuator 202 when the trigger 201 is pulled. Because there is provided a plurality of spaced apart pins 501, the stop position can be adjusted (in discreet steps) by pushing down different pins 501. Each of the pins 501 may be provided with a handle portion that allows a user to lift it up again. Alternatively, each of the pins 501 may comprise a spring and a locking member. The spring can bias the pin 501 to be in a pushed-up position, while the locking member may be used to lock the pin 501 in a pushed-down position.

Although the pins 501 are shown as being provided on the upper surface of the housing 305, it will be appreciated that the pins 501 may be provided on any surface of the housing 305.

FIG. 5*b* shows an adjustable stop member 204 comprising a sliding member 503. The sliding member 503 is arranged to slide along an axis parallel to the path of the actuator 202. The sliding member 503 comprises a stop portion intersecting the path of the actuator 202 (so as to stop the actuator 202), and a handle portion preferably provided on an outside surface of the housing 305 to allow a user to slide the sliding member 503 along the path of the actuator 202. Accordingly, the stop position can be adjusted by the user.

Although the sliding member 503 is shown as being provided on the upper surface of the housing 305, it will be appreciated that the sliding member 503 may be provided on any surface of the housing 305.

FIG. 5*c* shows an adjustable stop member 204 comprising a dual pin arrangement. The dual pin arrangement may comprise a main pin 504 arranged such that its major longitudinal axis is substantially parallel to the path of the actuator 202. The main pin 504 is preferably provided with a plurality of engaging portions along its length. The engaging portions may be ribs, holes, grooves or the like. The dual pin arrangement further may comprise an engaging pin 505 penetrating the housing 305 and arranged to engage with the engaging portions of the main pin 504. Thus, when the engaging pin 505 is engaged with one of the engaging portions of the main pin 504, the main pin 504 is held firmly in position and cannot be moved. The main pin 504 can thus act as a stop member 204 when it is engaged with the engaging pin 505. Both the main pin 504 and the engaging pin 505 are preferably accessible from outside of the housing 305 such that a user can adjust which engaging portion of the main pin 504 the engaging pin 505 is engaged to.

Although the engaging pin 505 is shown as being provided on the upper surface of the housing 305, it will be appreciated that the engaging pin 505 may be provided on any surface of the housing 305.

A further alternative of an adjustable stop member comprises a rack and a pinion. The rack is a linear gear. The pinion is preferably a circular gear. The gears of the pinion are configured to engage with the gears of the rack. The rack is arranged such that its major longitudinal axis is substantially parallel to the path of the actuator 202. An end portion of the rack may intersect with the path of the actuator 202, so as to stop the actuator 202. The pinion is preferably translationally fixed by the housing 305, while the rack is free to move along its major longitudinal axis. Thus, by rotating the pinion, the rack, including the end portion configured to stop the actuator 202, may be moved. Thus, by rotation of the pinion, the stop position can be adjusted. This arrangement may be particularly advantageous if access to the triggering mechanism is only available from surfaces of the housing 305 perpendicular to the path of the actuator 202. The pinion is preferably accessible from outside of the housing 305 such that a user can access it to perform a rotation thereof.

FIGS. 6*a* to 6*e* show alternative releasable coupling members 203 according to embodiments. It will be appreciated that each of the releasable coupling members 203 in FIGS. 6*a* to 6*e* can be combined with previous and/or later described embodiments of the trigger mechanism 100.

Figure 6A:
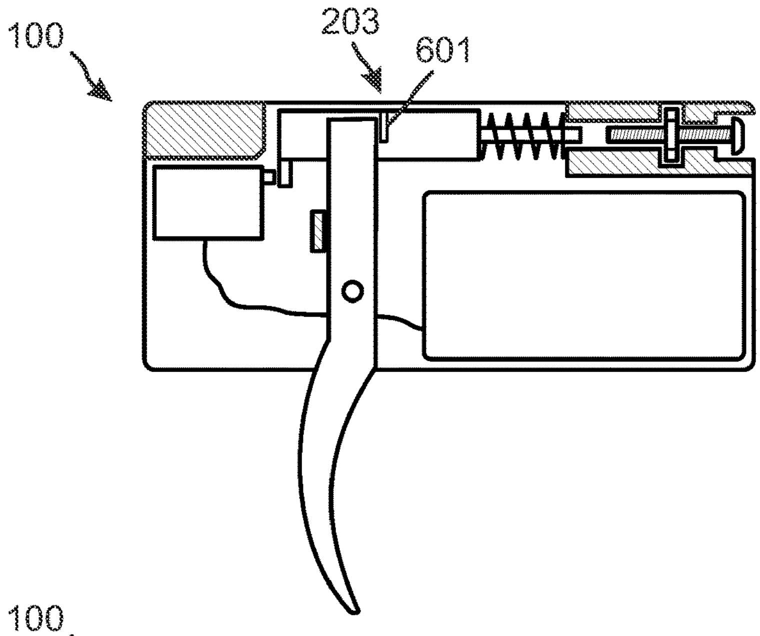
FIGS. 6*a*-6*e* show schematic views of alternative releasable coupling members according to embodiments.
Figure 6B:
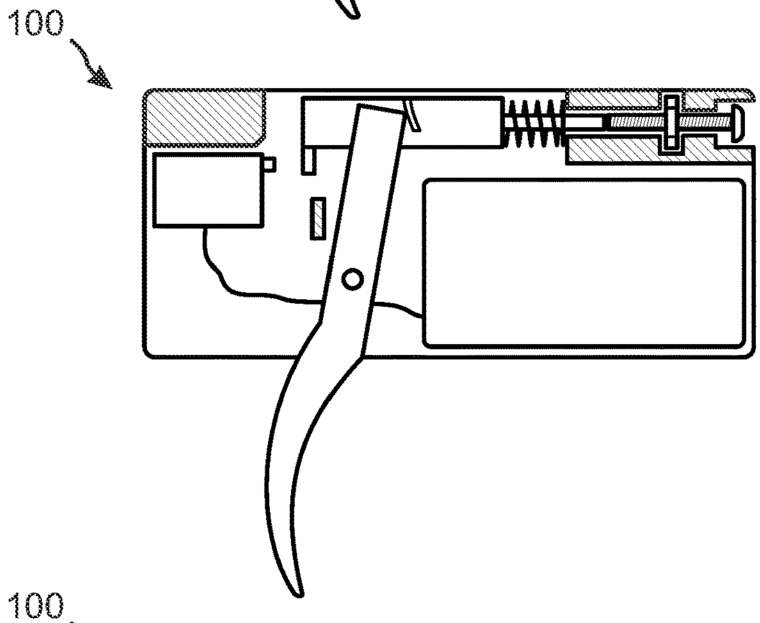
Figure 6C:
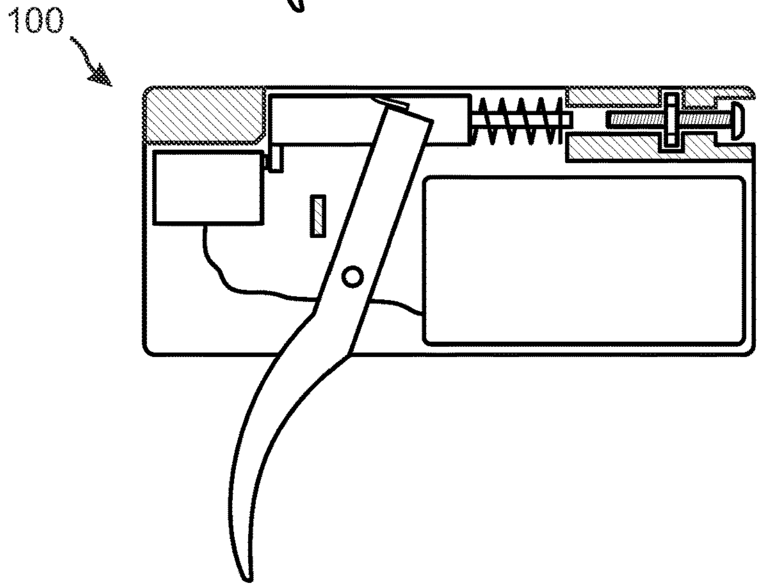

In FIGS. 6*a* to 6*c*, the releasable coupling member 203 comprises a relatively flexible flange 601 attached to the actuator 202 and positioned in front of the trigger 201 (in the direction of movement of the trigger 201). This allows interaction between the flange 601 and the trigger 201 when the trigger 201 is pulled. The flange 601 is sufficiently rigid to cause the actuator 202 to move with the trigger 201 when a pulling motion is performed on the trigger 201. Additionally, the flange 601 is sufficiently flexible to allow the trigger 201 to sufficiently bend the flange 601, after the actuator 202 has been stopped by the stop member 204. The trigger 201 can thus pass by the bent flange 601. FIG. 6*a* shows the triggering mechanism 100 in a default position with the flange 601 in an unbent position. FIG. 6*b* shows the triggering mechanism 100 at the moment when the actuator 202 is stopped by the stop member 204. At this position, the flange 601 is slightly bent by the trigger 201. FIG. 6*c* shows the triggering mechanism 100 with the flange 601 fully bent due to the further pulling motion. The trigger 201 thus passes by the flange 601 so as to decouple the actuator 202 from the trigger 201.

Figure 6D:
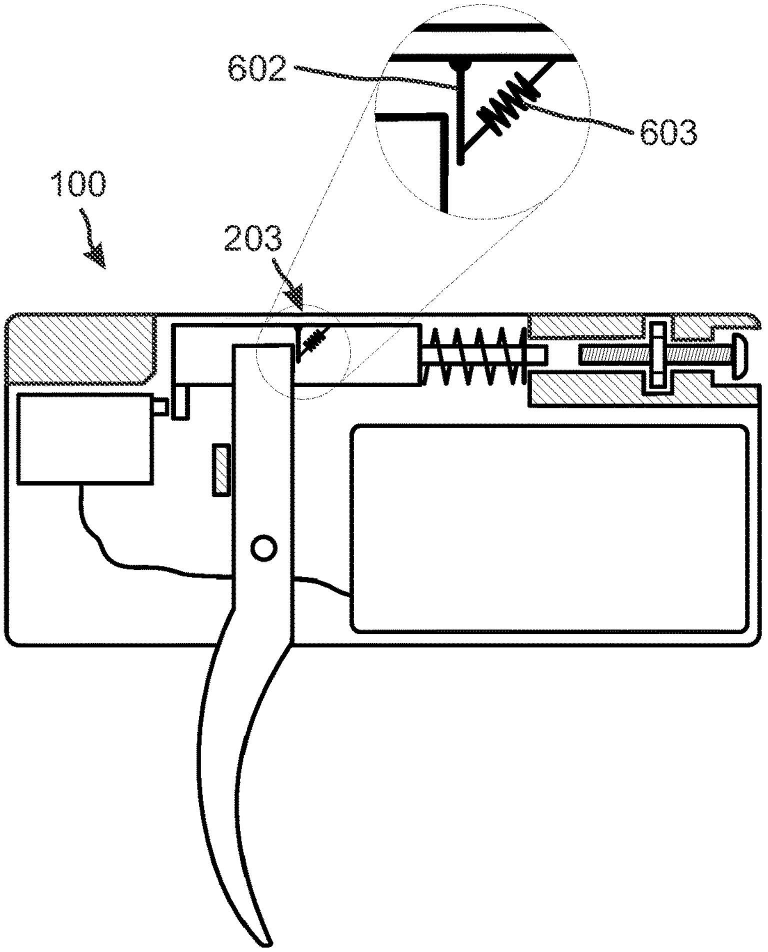

FIG. 6*d* shows a releasable coupling member 203 comprising a rigid pivoted flange 602 in connection with a stiffness member 603. The rigid flange 602 and the stiffness member 603 are attached to the actuator 202. The stiffness member 603 may be a spring, for example a torsional spring, arranged to oppose a pivoting motion of the rigid flange 602. Thus, as a pulling motion is performed on the trigger 201, the stiffness member 603 will restrict pivoting of the rigid flange 602, thus ensuring that the actuator 202 moves with the trigger 201. Once the stop position is reached, and further pulling motion is exerted on the trigger 201, the force on the trigger 201 will overcome the stiffness member 603, and accordingly the trigger 201 can pass the rigid flange 602 so as to decouple the actuator 202 from the trigger 201.

Figure 6E:
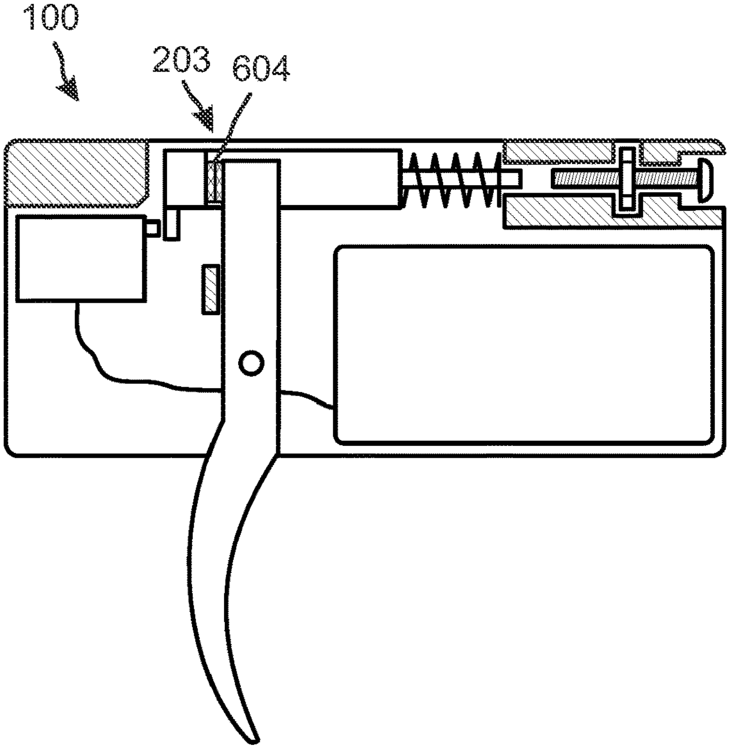

FIG. 6*e* shows a releasable coupling member 203 comprising a binding element 604. The binding element 604 is configured to bind the actuator 202 to the trigger 201, and upon a certain force being applied through the pulling motion of the trigger 201, separate the actuator 202 from the trigger 201. The binding element 604 is further configured to repeat said binding when the trigger 201 has been released. Examples of binding elements 604 include hook-and-loop fasteners and adhesives.

Figure 7A:
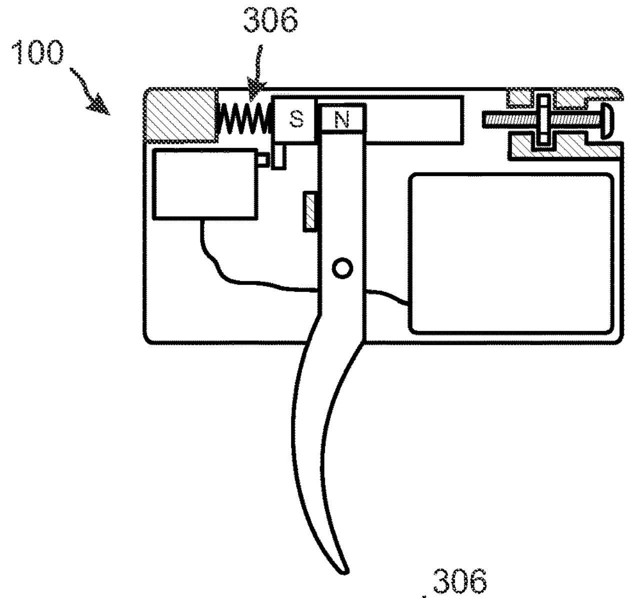
FIGS. 7*a*-7*c* show schematic views of alternative force exerting members according to embodiments.
Figure 7B:
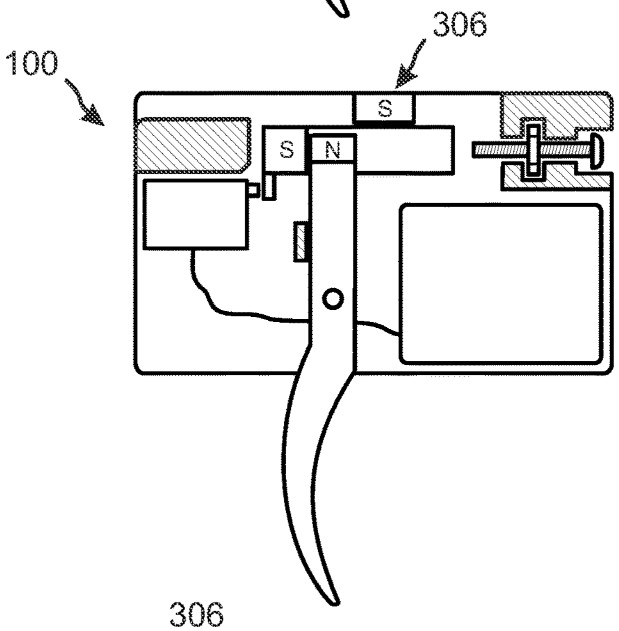
Figure 7C:
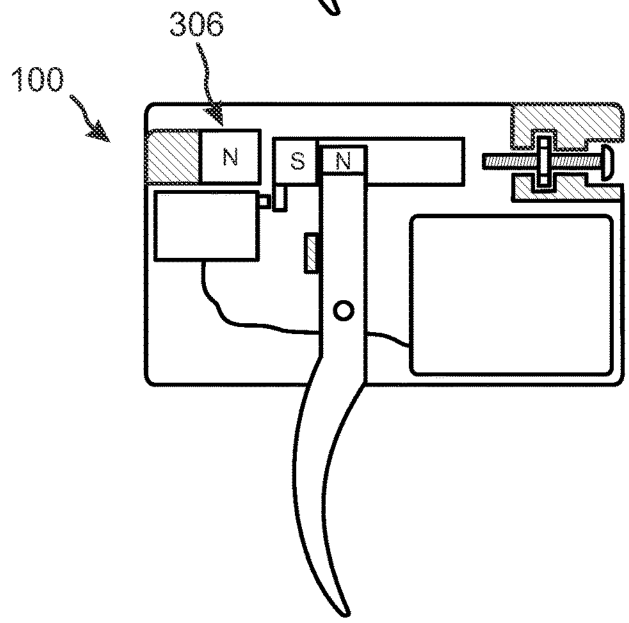

FIGS. 7*a* to 7*c* show alternative force exerting members 306 according to embodiments. It will be appreciated that each of the force exerting members 306 in FIGS. 7*a* to 7*c* can be combined with previous and/or later described embodiments of the trigger mechanism 100.

FIG. 7*a* shows a force exerting member 306 comprising a stiffness member similar to previous embodiments. The stiffness member (e.g. a spring) is, however, located on a side of the actuator 202 away from the stop member 204. Thus, as the actuator 202 is moved with the trigger 201, the stiffness member is extended. The force exerting member 306 will thus exert a force opposing the movement of the actuator 202. In the default position of the triggering mechanism 100, the stiffness member is preferably stressed. This ensures that the actuator 202 is forced, by the force exerting member 306, to move close to, or in contact with, the sensor 205.

FIG. 7*b* shows a force exerting member 306 comprising a magnet. In this embodiment, the releasable coupling member 203 comprises a magnet attached to the actuator 202. The trigger 201 may comprise a magnet of opposite polarity to the actuator magnet, or preferably, magnetic material. The magnet of the force exerting member 306 has the same polarity as the actuator magnet. Although the polarity is shown as a south pole in FIG. 7*b*, it will be appreciated that embodiments are not limited to this polarity. The force exerting magnet is located near the path of the actuator 202, at a position forward of the position of the actuator magnet when the actuator 202 is at the stop position. Thus, because the two magnets are of the same polarity, the actuator magnet will be repelled by the force exerting magnet. Hence, the force exerting magnet will oppose the movement of the actuator 202 towards the stop member 204. The force exerting magnet will further cause movement of the actuator 202 away from the stop member 204, upon the release of the actuator 202 from the trigger 201.

FIG. 7*c* also shows a force exerting member 306 comprising a magnet. Similarly to FIG. 7*b*, the releasable coupling member 203 comprises a magnet attached to the actuator 202. The trigger 201 may comprise a magnet of opposite polarity to the actuator magnet, or a magnetic material. The magnet of the force exerting member 306 has opposite polarity as the actuator magnet. Although specific polarities are shown in FIG. 7*c*, it will be appreciated that embodiments are not limited to this polarity. The force exerting magnet is located near the path of the actuator 202, at a side of the actuator 202 away from the stop member 204 when the actuator 202 is at the default position. Thus, because the two magnets are of the opposite polarity, the actuator magnet will be attracted by the force exerting magnet. Hence, the force exerting magnet will oppose the movement of the actuator 202 towards the stop member 204. The force exerting magnet will further cause movement of the actuator 202, upon the release of the actuator 202 from the trigger 201, away from the stop member 204.

Figure 8A:
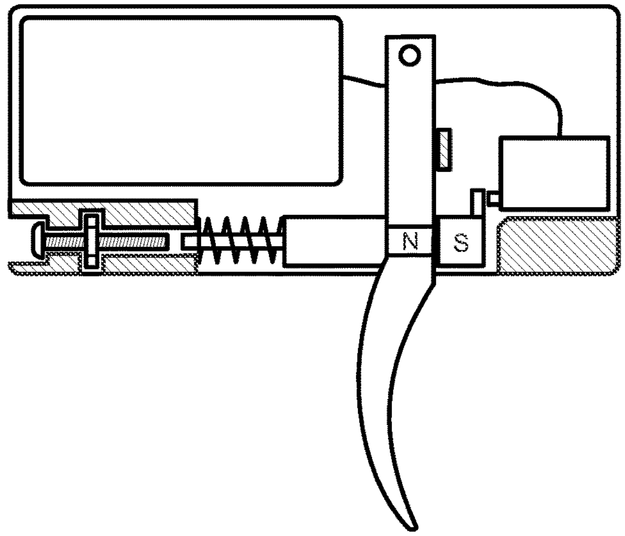
FIGS. 8*a*-8*c* show schematic views of triggering mechanisms according to embodiments.
Figure 8B:
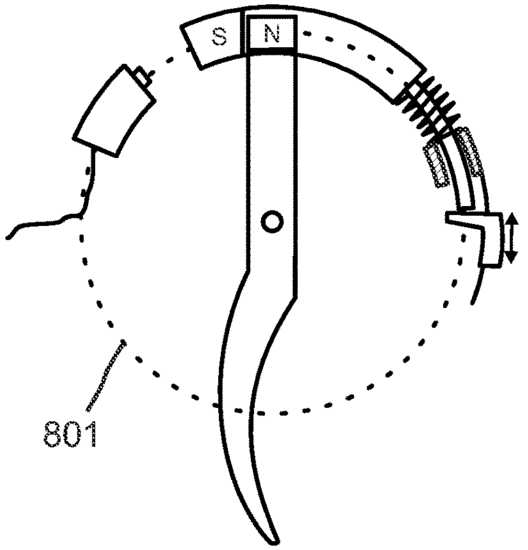
Figure 8C:
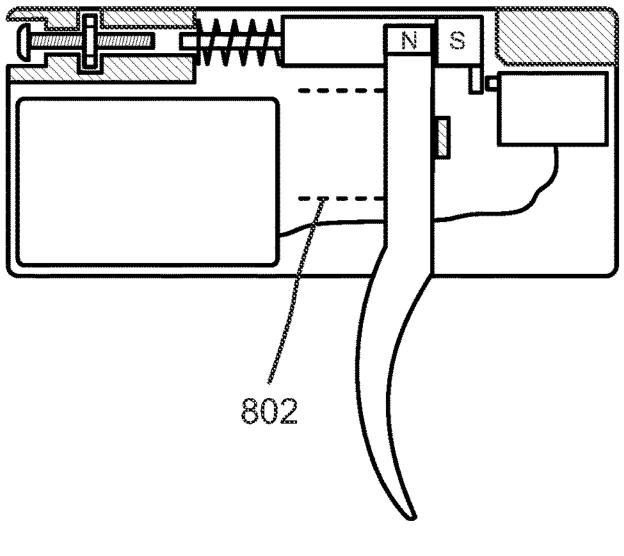

FIGS. 8*a* to 8*c* show alternative embodiments of the triggering mechanism 100.

FIG. 8*a* shows an embodiment with the trigger 201 is pivotably arranged such that the curved portion of the trigger 201 is on the same side of the pivot 206 as the portion of the trigger 201 that interacts with the actuator 202. Thus, as the curved portion of the trigger 201 is pulled back, the portion of the trigger 201 that interacts with the actuator 202 is moved in the same direction. Note that, in FIG. 8*a*, a portion of the actuator 202 is covered by the trigger 201.

FIG. 8*b* shows an embodiment where the actuator 202 is slidably arranged along a curved path 801, contrary to the linear path in previous embodiments. Preferably, the curved path 801 has a center of rotation close to, or at, the pivot 206, so as to allow the actuator 202 to closely follow the motion of the trigger 201.

FIG. 8*c* shows an embodiment where the trigger 201 is slidably arranged. The trigger 201 may be arranged to slide along a plurality of spaced apart sliding tracks 802. The trigger 201 thus moves translationally, rather than rotationally. In embodiments, the trigger 201 may be arranged to move both slidably and pivotably simultaneously or subsequently.

Apart from the above-described differences, the embodiments in FIGS. 8*a* to 8*c*, are substantially similar to the previously described embodiments. Each of these alternative embodiments may be combined with the different previously described releasable coupling members 203, adjustable stop members 204, sensors 205, and/or force exerting members 306.

Figure 9A:
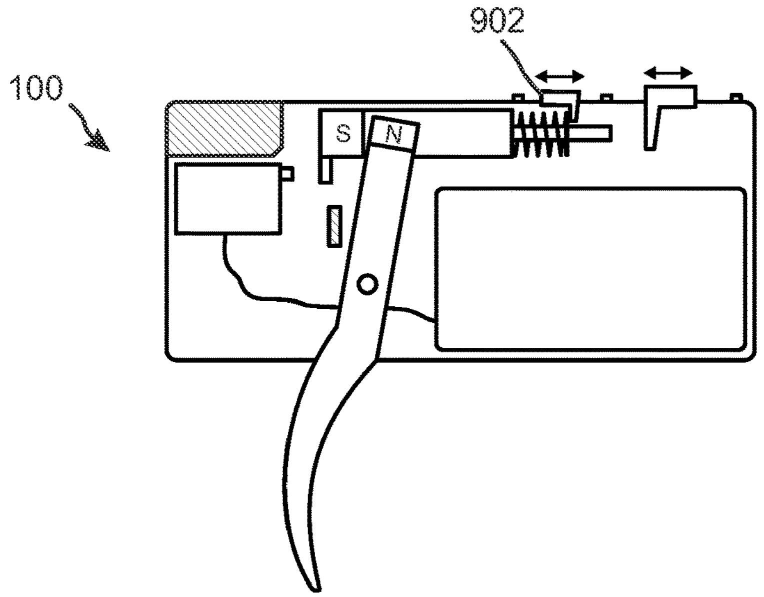
FIGS. 9*a*-9*c* show schematic views of force adjustment members according to embodiments.
Figure 9B:
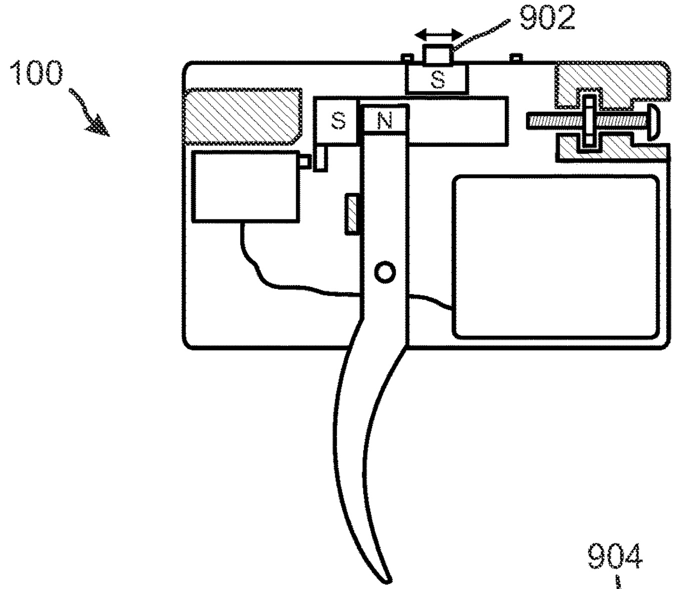
Figure 9C:
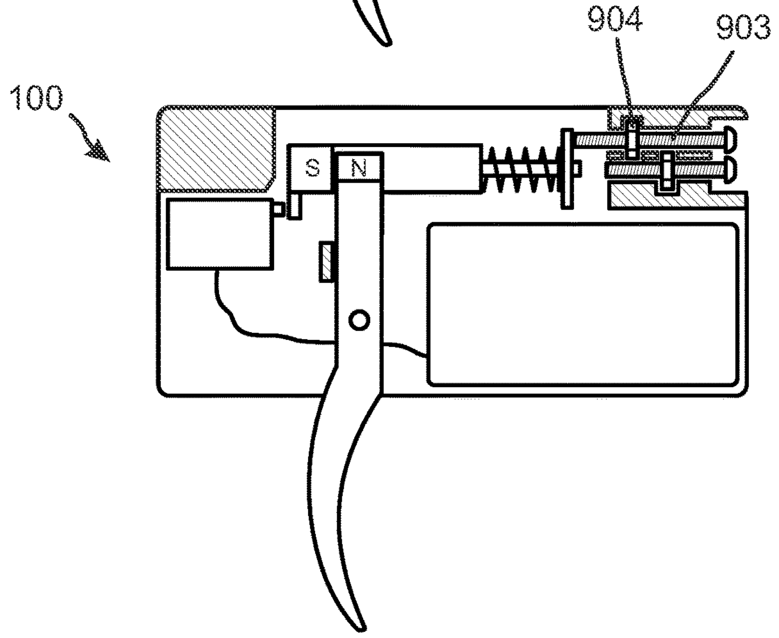

FIGS. 9*a* to 9*c* show trigger mechanism 100 according to embodiments where the force exerted by the force exerting member 306 can be adjusted. In embodiments, the force is adjusted by a force adjustment member. The resistance experienced by the user when pulling the trigger 201 can thus be adapted to mimic the resistance of a firearm that the user is accustomed to. In embodiments, the trigger resistance may be adjusted by the force adjustment member. In particular, a trigger resistance at the default trigger position may be adjusted by the force adjustment member. Alternatively, or additionally, a nominal trigger resistance may be adjusted by the force adjustment member.

FIGS. 9*a* and 9*b* show a triggering mechanism 100 with a force adjustment member comprising a sliding member 902. The triggering mechanism in FIG. 9*a* is substantially similar to the triggering mechanism of FIG. 5*b*, with the addition of the force adjustment member. The triggering mechanism in FIG. 9*b* is substantially similar to the triggering mechanism of FIG. 7*b*, with the addition of the force adjustment member.

The sliding member 902 of the force adjustment member is arranged to slide along an axis parallel to the path of the actuator 202. The sliding member 902 comprises a portion for providing contact with, or attachment to, the force exerting member 306. By moving at least a portion of the force exerting member 306, the force exerted by the force exerting member 306 on the actuator 202 may be changed. For example, if the force exerting member 306 is a stiffness member as shown in FIG. 9*a*, by moving the sliding member 902 (and thus an end portion of the stiffness member), a length of the stiffness member can be adjusted. Similarly, if the force exerting member 306 comprises a magnet as shown in FIG. 9*b*, the distance between the magnet of the force exerting member 306 and the magnet of the releasable coupling member 203 can be adjusted by the sliding member 902, which in turn will adjust the force exerted by the force exerting member 306.

The sliding member 902 may also comprise a handle portion preferably provided on an outside surface of the housing 305 to allow a user to slide the sliding member 902 in the left-right direction. Accordingly, the force exerted by the force exerting member 306 can easily be adjusted by the user.

FIG. 9*c* shows a triggering mechanism 100 with a force adjustment member 901 comprising a screw assembly. The triggering mechanism in FIG. 9*c* is substantially similar to the triggering mechanism of FIGS. 3*a* to 3*c*, with the addition of the force adjustment member. The screw assembly of the force adjustment member may comprise a screw 903 and a nut 904, or any other threaded member suitable for adjusting a stop position of the actuator 202. The screw 903 may be arranged such that its major longitudinal axis is substantially parallel to the path of the actuator 202. A threaded portion of the screw 903 protrudes through the nut 904 which is held firmly in place by a housing 305 of the triggering mechanism 100. Thus, by performing a screwing motion on the head of the screw 903, the length of the threaded portion of the screw 903 that protrudes through the nut 904 may be adjusted. In other words, the relative position of the screw 903 compared to the (fixed) nut 904 may be adjusted.

A tip end of the screw 903 (the left-most portion in FIG. 9*c*) is arranged to be in contact with, or attached to, the force exerting member 306. Thus, by performing a screwing motion on the screw 903, the tip end of the screw 903 will move in a direction parallel to the path of the actuator 202 (i.e. in the left-right direction in the figure). Hence, at least a portion of the force exerting member 306 is moved, such that the force exerted by the force exerting member 306 is adjusted. For example, if the force exerting member 306 is a stiffness member, by performing a screwing motion on the screw 903 (thus moving an end portion of the stiffness member), a length of the stiffness member can be adjusted. Similarly, if the force exerting member 306 comprises a magnet, the magnetic force exerted by the magnet on the actuator magnet, is dependent on the position of the force exerting member 306 which can be adjusted by the screwing motion.

Preferably, an opening is provided in the housing 305 to allow a user to access the head of the screw 903 without removing the housing 305. Thus, the user can access the screw 903 from outside of the housing 305, and by performing a screwing motion on the screw 903, adjust the force exerted by the force exerting member 306.

Although a screw assembly comprising a screw 903 and a nut 904 is shown in FIG. 9*c*, embodiments include other screw assemblies relying on a threaded elongated member engaging with a translationally fixed member. It will thus be appreciated that embodiments are not limited to a screw and/or a nut, and that other mutually engaging members are included in the scope of the invention.

For example, the screw assembly may comprise a worm screw assembly. The worm screw assembly may comprise a threaded elongated worm, engaging with a translationally fixed worm wheel. The worm wheel has substantially the shape of a hollow cylinder. The worm wheel comprises, on an external portion, cogs, teeth or the like to engage with the threads of the worm. The worm may be arranged tangentially to the worm wheel.

The worm wheel is threaded on an internal surface. The worm screw assembly further comprises a stop screw in the form of a threaded elongated member. The stop screw is arranged to extend through the worm wheel and to engage with the internal threads of the worm wheel. The stop screw is rotationally fixed but translationally moving along its major longitudinal axis by rotation of the worm wheel.

Thus, by performing a screwing motion on the worm, the worm wheel is caused to rotate. Due to the rotation of the worm wheel, the stop screw, which is rotationally fixed, moves translationally along its major longitudinal axis (due to the engaging threads between the stop screw and the internal surface of the worm wheel). A length of the stop screw that protrudes through the worm wheel is thus adjusted.

The stop screw may be arranged such that its major longitudinal axis is substantially parallel to the path of the actuator 202. An end portion of the stop screw is arranged to be in contact with, or attached to, the force exerting member 306. Hence, at least a portion of the force exerting member 306 can be moved by performing a screwing motion on the worm. Thus, a force exerted by the force exerting member 306 can be adjusted. For example, if the force exerting member 306 is a stiffness member, by performing a screwing motion on the worm (thus moving an end portion of the stop screw), a length of the stiffness member can be adjusted. Similarly, if the force exerting member 306 comprises a magnet, the magnetic force exerted by the magnet on the actuator magnet, is dependent on the position of the force exerting member 306 which can be adjusted by the screwing motion.

The worm is preferably accessible from outside of the housing 305. A worm screw may thus be particularly preferred if access is only available from surfaces of the housing 305 perpendicular to the path of the actuator 202 (e.g. the upper side, front side, or back side).

Although a stiffness member is shown as the force exerting member 306 in FIG. 9*c*, it will be appreciated that embodiments are not limited to this force exerting member 306.

The force adjustment member may additionally, or alternatively, comprise a dual pin arrangement. The dual pin arrangement may comprise a main pin arranged such that its major longitudinal axis is substantially parallel to the path of the actuator 202. An end portion of the main pin is arranged to contact, or attach to, the force exerting member 306. The main pin is preferably provided with a plurality of engaging portions along its length. The engaging portions may be ribs, holes, grooves or the like. The dual pin arrangement further comprises an engaging pin penetrating the housing 305 and arranged to engage with the engaging portions of the main pin. Thus, when the engaging pin is engaged with one of the engaging portions of the main pin, the main pin is held firmly in position and cannot be moved. Both the main pin and the engaging pin are preferably accessible from outside of the housing 305 such that a user can adjust which engaging portion of the main pin the engaging pin is engaged to.

The force adjustment member may additionally, or alternatively, comprise a rack and a pinion. The rack is a linear gear. The pinion is preferably a circular gear. The gears of the pinion are configured to engage with the gears of the rack. The rack is arranged such that its major longitudinal axis is substantially parallel to the path of the actuator 202. An end portion of the rack may be arranged to be in contact with, or attached to, the force exerting member 306. The pinion is preferably translationally fixed by the housing 305, while the rack is free to move along its major longitudinal axis. Hence, at least a portion of the force exerting member 306 can be moved by rotating the pinion. Thus, a force exerted by the force exerting member 306 can be adjusted. For example, if the force exerting member 306 is a stiffness member, by rotating the pinion (thus moving an end portion of the rack), a length of the stiffness member can be adjusted. Similarly, if the force exerting member 306 comprises a magnet, the magnetic force exerted by the magnet on the actuator magnet, is dependent on the position of the force exerting member 306 which can be adjusted by rotation of the pinion. The pinion is preferably accessible from outside of the housing 305. This arrangement may be particularly advantageous if access to the triggering mechanism is only available from surfaces of the housing 305 perpendicular to the path of the actuator 202.

Although the force adjustment member has been described in relation to embodiments comprising an adjustable stop member 204, it will be appreciated that the force adjustment member 901 is equally applicable to embodiments with a fixed stop member, or no stop member at all.

In the case of a triggering mechanism 100 with no stop member, the force exerted by the force exerting member 306 on the actuator 202 may be configured to cause the release or decoupling of the actuator 202 from the trigger 201. That is, the force exerted by the force exerting member 306 on the actuator 202 is arranged to overcome, at the trigger threshold position, the coupling force of the releasable coupling member 203. It is noted that the force exerted by the force exerting member 306 on the actuator 202 may be dependent on the position of the actuator 202. Thus, the force may increase as the actuator 202 moves closer to the threshold position. Thus, the force exerting member 306 may be configured such that, at the threshold position, the combined force opposing movement of the actuator 306 is equal and opposite to the coupling force of the releasable coupling member 203. Thus, when further pulling motion is performed, the actuator 202 is released from the trigger 201.

Throughout this specification, the word "may" is used in a permissive sense (i.e. meaning having the potential to), rather than in the mandatory sense (i.e. meaning must).

Throughout this specification, the words "comprise", "include", and variations of the words, such as "comprising" and "comprises", "including", "includes", do not exclude other elements or steps.

As used throughout this specification, the singular forms "a", "an", and "the", include plural referents unless explicitly indicated otherwise. Thus, for example, reference to "an" element includes a combination of two or more elements, notwithstanding use of other terms and phrases for one or more elements, such as "one or more" or "at least one".

The term "or" is, unless indicated otherwise, non-exclusive, i.e. encompassing both "and" and "or". For example, the feature "A or B" includes feature "A", feature "B" and feature "A and B".

Unless otherwise indicated, statements that one value or action is "based on" and/or "in dependence on" another condition or value or action, encompass both instances in which the condition or value or action is the sole factor and instances where the condition or value or action is one factor among a plurality of factors.

Unless otherwise indicated, statements that "each" instance of some collection have some property should not be read to exclude cases where some otherwise identical or similar members of a larger collection do not have the property, i.e. each does not necessarily mean each and every.

Embodiments include the following numbered clauses:

1. A triggering mechanism for a weapon, the triggering mechanism comprising:

a moveably arranged trigger;

an actuator slidably arranged along a path;

a releasable coupling member, wherein the releasable coupling member is configured to couple the actuator with the trigger such that when a pulling motion is exerted on the trigger, the actuator moves in a first direction along the path;

a force exerting member arranged to oppose a movement of the actuator in the first direction;

a force adjustment member configured to adjust a force exerted by the force exerting member on the actuator; and a stop member configured to stop the movement of the actuator in the first direction at a stop position, such that further pulling motion on the trigger causes the actuator to be released from the trigger and to be moved in a second direction along the path, wherein the second direction is different to the first direction; and a sensor configured to detect movement of the actuator in the second direction and in response to the detection transmit a trigger signal.

2. The triggering mechanism according to clause 1, wherein the adjustable stop member comprises one or more of:

a threaded member extending along the path and arranged to contact the force exerting member, and a translationally fixed engaging member for engaging with the threaded member, wherein a position of the threaded member along the path is adjustable by a screwing motion;

a rack gear extending along the path and a rotatable pinion gear arranged to engage with the rack gear, wherein a position of the rack gear along the path is adjustable by a rotation of the pinion gear;

a sliding member slidably arranged along the path, wherein the sliding member comprises a portion for interaction with the force exerting member; and a dual pin arrangement comprising:

a main pin extending along the path and arranged to be moveable along the path, wherein an end portion of the main pin is arranged to contact the force exerting member, wherein the main pin comprises a plurality of engaging portions; and an engaging pin arranged to engage with the engaging portions of the main pin so as to prevent movement of the main pin.

3. A triggering mechanism for a weapon, the triggering mechanism comprising:

a moveably arranged trigger;

an actuator slidably arranged along a path;

a releasable coupling member, wherein the releasable coupling member is configured to couple the actuator to the trigger such that when a pulling motion is exerted on the trigger, the actuator moves in a first direction along the path;

a force exerting member arranged to oppose a movement of the actuator in the first direction, wherein a force exerted by the force exerting member on the actuator is configured to be dependent on the pulling motion, wherein the force exerting member is arranged to, in response to the exerted force exceeding a predetermined amount, cause the actuator to be released from the trigger and to be moved in a second direction along the path, wherein the second direction is different to the first direction;

a sensor configured to detect movement of the actuator in the second direction and in response to the detection transmit a trigger signal; and a force adjustment member configured to adjust the force exerted by the force exerting member.

4. The triggering mechanism according to clause 3, wherein the adjustable stop member comprises one or more of:

a threaded member extending along the path and arranged to contact the force exerting member, and a translationally fixed engaging member for engaging with the threaded member, wherein a position of the threaded member along the path is adjustable by a screwing motion;

a rack gear extending along the path and a rotatable pinion gear arranged to engage with the rack gear, wherein a position of the rack gear along the path is adjustable by a rotation of the pinion gear;

a sliding member slidably arranged along the path, wherein the sliding member comprises a portion for interaction with the force exerting member; and a dual pin arrangement comprising:

a main pin extending along the path and arranged to be moveable along the path, wherein an end portion of the main pin is arranged to contact the force exerting member, wherein the main pin comprises a plurality of engaging portions; and an engaging pin arranged to engage with the engaging portions of the main pin so as to prevent movement of the main pin.

5. A triggering mechanism for a weapon, the triggering mechanism comprising:

a moveably arranged trigger;

an actuator slidably arranged along a path;

a releasable coupling member, wherein the releasable coupling member is configured to couple the actuator with the trigger such that when a pulling motion is exerted on the trigger, the actuator moves in a first direction along the path;

an adjustable stop member configured to stop the movement of the actuator in the first direction at an adjustable stop position, such that further pulling motion on the trigger causes the actuator to be released from the trigger and to be moved in a second direction along the path, wherein the second direction is different to the first direction; and a sensor configured to detect movement of the actuator in the second direction and in response to the detection transmit a trigger signal.

6. The triggering mechanism according to clause 5, wherein the trigger comprises a curved portion, wherein the curved portion is configured to receive the pulling motion by the user.

The invention claimed is:

1. A triggering mechanism for a weapon, the triggering mechanism comprising:

a moveably arranged trigger;

an actuator slidably arranged along a path;

a releasable coupling member, wherein the releasable coupling member is configured to couple the actuator with the trigger such that when a pulling motion is exerted on the trigger, the actuator moves in a first direction along the path;

an adjustable stop member configured to stop the movement of the actuator in the first direction at an adjustable stop position, such that further pulling motion on the trigger causes the actuator to be released from the trigger and to be moved in a second direction along the path, wherein the second direction is different than the first direction; and a sensor configured to detect movement of the actuator in the second direction and in response to the detection transmit a trigger signal.

2. The triggering mechanism according to claim 1, wherein the adjustable stop member comprises one or more of:

a threaded member extending along the path and a translationally fixed engaging member for engaging with the threaded member, wherein a position of the threaded member along the path is adjustable by a screwing motion;

a rack and pinion assembly including a rack gear extending along the path, and a rotatable pinion gear arranged to engage with the rack gear, wherein a position of the rack gear along the path is adjustable by a rotation of the pinion gear;

a plurality of pins extending along an axis substantially perpendicular to the path and spaced apart along the path, wherein the pins are moveable along the axis, and wherein each of the plurality of pins is arranged to, in a first position, stop the movement of the actuator in the first direction, and in a second position, allow movement of the actuator in the first direction;

a sliding member slidably arranged along the path, wherein the sliding member comprises a stop portion for interaction with the actuator; and a dual pin arrangement including a main pin extending along the path and arranged to be moveable along the path, wherein the main pin comprises a plurality of engaging portions, and an engaging pin arranged to engage with the engaging portions of the main pin so as to prevent movement of the main pin.

3. The triggering mechanism according to claim 1, wherein the adjustable stop member comprises:

a threaded member extending along the path, and a translationally fixed engaging member for engaging with the threaded member, wherein a position of the threaded member along the path is adjustable by a screwing motion.

4. The triggering mechanism according to claim 3, wherein the threaded member is a screw, wherein the fixed engaging member is a nut, and wherein the position of the screw along the path is adjustable by a screwing motion preformed on the screw.

5. The triggering mechanism according to claim 1, wherein the triggering mechanism further comprises a force exerting member arranged to oppose a movement of the actuator in the first direction.

6. The triggering mechanism according to claim 5, wherein the force exerting member is configured to cause the actuator to move in the second direction when the actuator has been released from the trigger.

7. The triggering mechanism according to claim 5, wherein the force exerting member comprises one or more of: a stiffness member and a magnetic member.

8. The triggering mechanism according to claim 5, wherein the triggering mechanism further comprises a force adjustment member configured to adjust the force exerted by the force exerting member.

9. The triggering mechanism according to claim 8, wherein the force adjustment member comprises one or more of:

a threaded member extending along the path and arranged to contact the force exerting member, and a translationally fixed engaging member for engaging with the threaded member, wherein a position of the threaded member along the path is adjustable by a screwing motion;

a rack and pinion assembly including a rack gear extending along the path and arranged to contact the force exerting member, and a rotatable pinion gear arranged to engage with the rack gear, wherein a position of the rack gear along the path is adjustable by a rotation of the pinion gear;

a sliding member slidably arranged along the path, wherein the sliding member comprises a portion for interaction with the force exerting member; and a dual pin arrangement including a main pin extending along the path and arranged to be moveable along the path, wherein an end portion of the main pin is arranged to contact the force exerting member, wherein the main pin comprises a plurality of engaging portions, and an engaging pin arranged to engage with the engaging portions of the main pin so as to prevent movement of the main pin.

10. The triggering mechanism according to claim 1, wherein the sensor comprises one or more of: a proximity sensor; a contact sensor; an optical sensor; and an internal motion sensor.

11. The triggering mechanism according to claim 1, wherein the releasable coupling member comprises one or more of: a magnetic coupling member, a flexible lever, and a pivotably arranged lever connected to a stiffness member.

12. The triggering mechanism according to claim 1, wherein the releasable coupling member is a magnetic coupling member comprising one or more of:

a magnet with a first magnetic pole attached to the actuator and wherein the trigger comprises a magnetic material forming a second magnetic pole of opposite polarity to the first magnetic pole;

a magnet with a first magnetic pole attached to the actuator and a magnet with a second magnetic pole of opposite polarity to the first magnetic pole attached to the trigger; and a magnet with a first magnetic pole attached to the trigger, and wherein the actuator comprises a magnetic material forming a second magnetic pole of opposite polarity to the first magnetic pole.

13. The triggering mechanism according to claim 1, wherein the weapon is a firearm.

14. The triggering mechanism according to claim 1, wherein the weapon is a simulation weapon.

15. The triggering mechanism according to claim 1, wherein the trigger is pivotably arranged or slidably arranged.

16. The triggering mechanism according to claim 15, wherein the trigger comprises a first portion and a second portion, wherein the first and the second portions are separated by the pivot.

17. The triggering mechanism according to claim 16, wherein the releasable coupling member is configured to couple the first portion to the actuator, and wherein the second portion is configured to receive the pulling motion.

18. A method for triggering a weapon, the method comprising:

adjusting a stop position of an adjustable stop member;

coupling, by a releasable coupling member, a moveably arranged trigger with an actuator slidably arranged along a path;

performing a pulling motion on the trigger so as to move the actuator in a first direction along the path;

stopping, by the adjustable stop member, the movement of the actuator in the first direction at the stop position;

performing a further pulling motion on the trigger so as to cause the actuator to be released from the trigger and to be moved in a second direction along the path, wherein the second direction is different than the first direction;

detecting, by a sensor, movement of the actuator in the second direction; and transmitting, in response to the detection, a trigger signal.

19. A triggering mechanism for a weapon, the triggering mechanism comprising:

a moveably arranged trigger;

an actuator slidably arranged along a path;

a releasable coupling member, wherein the releasable coupling member is configured to couple the actuator with the trigger such that when a pulling motion is exerted on the trigger, the actuator moves in a first direction along the path;

a force exerting member arranged to oppose a movement of the actuator in the first direction;

a force adjustment member configured to adjust a force exerted by the force exerting member on the actuator; and a stop member configured to stop the movement of the actuator in the first direction at a stop position, such that a further pulling motion on the trigger causes the actuator to be released from the trigger and to be moved in a second direction along the path, wherein the second direction is different than the first direction; and a sensor configured to detect movement of the actuator in the second direction and in response to the detection transmit a trigger signal.

20. The triggering mechanism according to claim 19, wherein the force adjustment member comprises one or more of:

a threaded member extending along the path and arranged to contact the force exerting member, and a translationally fixed engaging member for engaging with the threaded member, wherein a position of the threaded member along the path is adjustable by a screwing motion;

a rack and pinion assembly including a rack gear extending along the path and arranged to contact the force exerting member, and a rotatable pinion gear arranged to engage with the rack gear, wherein a position of the rack gear along the path is adjustable by a rotation of the pinion gear;

a sliding member slidably arranged along the path, wherein the sliding member comprises a portion for interaction with the force exerting member; and a dual pin arrangement including a main pin extending along the path and arranged to be moveable along the path, wherein an end portion of the main pin is arranged to contact the force exerting member, wherein the main pin comprises a plurality of engaging portions, and an engaging pin arranged to engage with the engaging portions of the main pin so as to prevent movement of the main pin.

* * * * *